US008566139B2

(12) United States Patent  
Fedosovskiy et al.

(10) Patent No.: US 8,566,139 B2  
(45) Date of Patent: Oct. 22, 2013

(54) METHOD FOR DETERMINISTIC SAFETY ANALYSIS IN NON-STATIONARY HIGH RISK SYSTEM, CONTROL METHOD AND CONTROL SYSTEM USING THEREOF

(75) Inventors: Mikhail Evgenievich Fedosovskiy, St. Petersburg (RU); Alexander Evgenievich Sherstobitov, St Petersburg (RU); Vadim Igorevich Dunaev, St. Petersburg (RU); Yurii Vladimirovich Kopiev, Moscow (RU)

(73) Assignee: Diakont Advanced Technologies, Inc., San Diego, CA (US)

( * ) Notice: Subject to any disclaimer, the term of this patent is extended or adjusted under 35 U.S.C. 154(b) by 1315 days.

(21) Appl. No.: 11/943,531

(22) Filed: Nov. 20, 2007

(65) Prior Publication Data

US 2008/0288121 A1    Nov. 20, 2008

Related U.S. Application Data

(63) Continuation of application No. PCT/RU2006/000268, filed on May 22, 2006.

(30) Foreign Application Priority Data

May 20, 2005   (RU) ................................ 2005116169

(51) Int. Cl.  
  *G06Q 10/06*   (2012.01)
(52) U.S. Cl.  
  CPC ............ *G06Q 10/0635* (2013.01); *G06Q 10/06* (2013.01)  
  USPC ........................................................ 705/7.28
(58) Field of Classification Search  
  CPC .................................................. G06Q 10/0635  
  USPC ........................................................ 705/7.28  
  See application file for complete search history.

(56) References Cited

U.S. PATENT DOCUMENTS

| 4,632,802 A | 12/1986 | Herbst et al. |
| 5,331,579 A | 7/1994 | Maguire, Jr. et al. |

(Continued)

FOREIGN PATENT DOCUMENTS

| CN | 101185078 A | 5/2008 |
| EP | 0411873 A2 | 2/1991 |

(Continued)

OTHER PUBLICATIONS

Applications of probabilistic safety assessment for nuclear power plants, 2001.*

(Continued)

*Primary Examiner* — Peter Choi  
*Assistant Examiner* — Kurtis Gills  
(74) *Attorney, Agent, or Firm* — Knobbe, Martens, Olson & Bear LLP

(57) ABSTRACT

A method and systems of safety analysis of engineering processes for safety analysis of nuclear power stations are disclosed. A distribution of risk factors is analysed on different stages of the engineering process, and safety intervals are determined where safety conditions remain invariable. The method further includes analysis of failure transitions from one safety interval into another by means of cause-effect analysis. Based on the results of this analysis, deterministic safety models are created for possible scenarios of transition of failures from one safety interval into another. The method and systems provide quantitative safety analysis and evaluation for engineering processes in variable safety conditions and enable creating valid safety requirements to perform optimization of an engineering processes control system.

18 Claims, 19 Drawing Sheets

(56) References Cited

U.S. PATENT DOCUMENTS

| | | |
|---|---|---|
| 6,195,624 B1 | 2/2001 | Woodman et al. |
| 6,532,426 B1* | 3/2003 | Hooks et al. ............... 702/81 |
| 7,369,965 B2* | 5/2008 | Mylaraswamy et al. ..... 702/185 |
| 7,778,897 B1* | 8/2010 | Rachev et al. ............... 705/35 |
| 2003/0004679 A1 | 1/2003 | Tryon, III et al. |
| 2003/0065454 A1* | 4/2003 | Perdue et al. ............... 702/34 |
| 2003/0235264 A1* | 12/2003 | Pappone ............... 376/259 |
| 2004/0086071 A1 | 5/2004 | Lee et al. |
| 2005/0149289 A1* | 7/2005 | Whaling et al. ............... 702/181 |
| 2006/0184825 A1* | 8/2006 | Regan ............... 714/23 |
| 2012/0078063 A1* | 3/2012 | Moore-Ede ............... 600/300 |

FOREIGN PATENT DOCUMENTS

| | | |
|---|---|---|
| EP | 1 378 916 | 1/2004 |
| EP | 1 699 058 | 9/2006 |
| EP | 1889193 A2 | 2/2008 |
| RU | 2030800 C1 | 3/1995 |
| RU | 1429821 A1 | 9/1999 |
| RU | 2150756 C1 | 6/2000 |
| RU | 2181510 C1 | 4/2002 |
| RU | 2005116169 | 11/2006 |
| RU | 2335025 C1 | 9/2008 |
| WO | WO 03/005376 | 1/2003 |

OTHER PUBLICATIONS

Cepin, Probabilistic safety assessment improves surveillance requirements in technical specifications, 1997.*

Krishnasamy, Development of a risk based maintenance strategy for a power-generating plant, 2005.*

T. Lee K. Harrison, Assessing safety culture in nuclear power stations, Safety Science, Pergamom, Elsevier, 2000, http://perso.crc.mines-paristech.fr/~wim.van_wassenhove/REX/Nuclear16.pdf.*

Groen et al., "QRAS—The Quantitative Risk Assessment System," Reliability Engineering and System Safety, Elsevier Applied Science, GB, vol. 91, No. 3, Apr. 7, 2006, pp. 292-304.

Yong Ou et al., "Multi-Phase Reliability Analysis for Dynamic and Static Phases," 2002 Proceeding of the Annual Reliability and Maintainability Symposium, The International Symposium on Product Qyality and Intergrity, RAMS, Seattle, WA, Jan. 28-31, 2002; Annual Reliability and Maintainability Symposium, New York, NY: IEEE, US, Jan. 28, 2002, pp. 404-140.

M. Bozzano et al., "ESACS: An Integrated Methodology for Design and Safety Analysis of Complex Systems," Proc. European Safety and Reliability Conference, Jun. 15-18, 2003, pp. 1-8.

L. Meshkat et al., "An Overview of the Phase-Modular Fault Tree Approach to Phase Mission System Analysis," Space Mission Challenges for Information Technology 2003, Jul. 13, 2003, pp. 1-10.

Ronza et al., "A Quantitative Risk Analysis Approach to Port Hydrocarbon Logistics," Journal of Hazardous Materials, Elsevier, vol. 128, No. 1, Jan. 16, 2006, pp. 10-24.

Berg H. P. et al, "Application of Probabilistic Safety Assessment in the Regulatory Process in Germany," Kemtechnik, Carl Hanser Verlag, Munchen, DE, vol. 60, No. 2/3, May 1, 1995, pp. 88-90.

"Applications of probabilistic safety assessment (PSA) for nuclear power plants", International Atomic Energy Agency (IAEA), Feb. 2001, 102 pages.

M. Cepin et al., "Probabilistic safety assessment improves surveillance requirements in technical specifications", Reliability Engineering System Safety S6, 1997, pp. 69-77.

Krishnasamy et al., "Development of a risk-based maintenance (RBM) strategy for a power-generating plant", Journal of Loss Prevention in the Process Industries, 18, Jan. 6, 2005, pp. 69-81.

International Search Report for International Patent Application No. PCT/RU2006/000268 dated Apr. 24, 2007.

Patent Granting Decision from Russian patent application No. 2007125615 dated Jul. 2, 2007.

Office Action from Russian patent application No. 2005116169 dated Jun. 9, 2006.

* cited by examiner

| Type of OMSP | Risk factors | Sections of a technological operations ||||||||
|---|---|---|---|---|---|---|---|---|---|
| | | 1 | 2 | 3 | 4 | 5 | 6 | 7 | 8 |
| Downfall of a fuel assembly (OMSP1) | Potential unauthorized opening of a fuel assembly claw during transportation of the fuel assembly | ■ | ■ | ■ | | | | | |
| | Potential movement of a fuel assembly with partially opened claw | ■ | ■ | ■ | | | | | |
| | Downfall of a fuel assembly installed incorrectly | | | | | | ■ | | |
| | Potential clinging of a fuel assembly as a result of fuel assembly stuck when the claw is fully opened | | | | | | ■ | ■ | |
| | Potential clinging of a fuel assembly as a result of fuel assembly stuck when the claw is partially opened | | | | | | ■ | ■ | |
| Torsion moment (OMSP2) | Potential unauthorized pivot of an Operation beam | | | | | ■ | ■ | | |
| Side impact (OMSP3) | Potential unauthorized movement of a shell | ■ | ■ | | | | | ■ | |
| | Potential unauthorized movement of a cart | ■ | ■ | | | | | ■ | |
| Removal / installing force (OMSP4) | Potential error in shell coordinates when transporting shell to fuel assembly location | | | | ■ | ■ | | | |
| | Potential error when transporting cart to fuel assembly location | | | | ■ | ■ | | | |
| | Possible deviation of geometrical sizes of a fuel assembly | | | | ■ | ■ | | | |
| | Possible presence of unauthorized object on location zone of a fuel assembly | | | | ■ | ■ | | | |
| Pinch force (OMSP5) | Possible movement of claw with a fuel assembly with unauthorized speed | | | | | ■ | | | |
| | Potential unauthorized movement of a claw with a fuel assembly down | | | | | | ■ | ■ | ■ |
| Upper extreme position of a fuel assembly (OMSP6) | Possible unauthorized movement of a claw with a fuel assembly over the prescribed transportation location | ■ | ■ | ■ | | | | | |
| Bending force (OMSP7) | Possible unauthorized movement of a shell | | | | ■ | ■ | ■ | | |
| | Possible unauthorized movement of a cart | | | | ■ | ■ | ■ | | |

FIG. 1

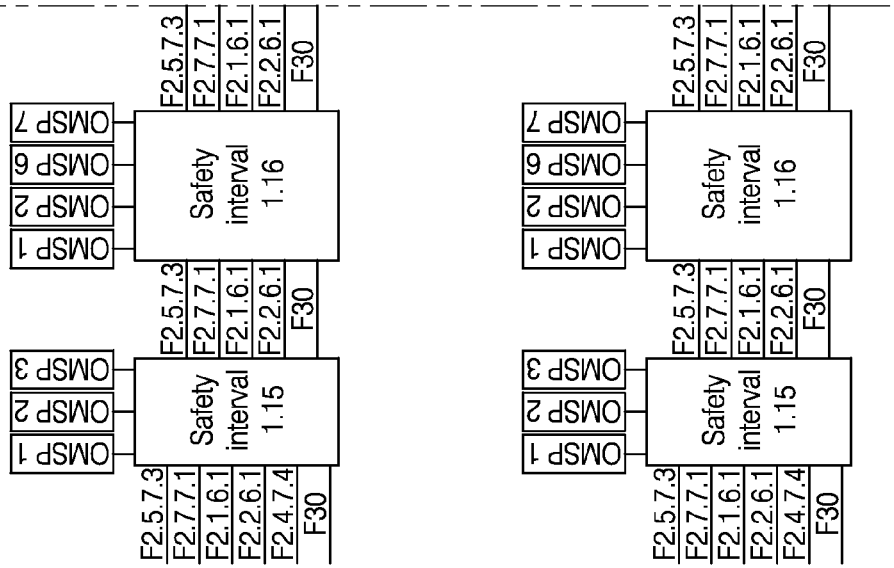

| Failures | Failure reasons | Transport position of a fuel assembly | | | Head level of fuel assemblies in a reactor | | Receptacle level | | Transport position of a fuel assembly | |
|---|---|---|---|---|---|---|---|---|---|---|
| Downfall of fuel assembly | Opening of claw with fuel assembly during transportation | ■■■■■■■■ | | | | | | | | |
| | Downfall of a fuel assembly installed incorrectly | | | | | | | ■■■■ | | |
| Torsion moment | Turnover of operating stick | | | | ■■■■■■■■■■■■ | | | | | |
| Side impact | Bridge movement | ■■■■ | | | | | | | | |
| Overrun of maximal acceptable extraction/ installation force | Foreign object in the zone | | | | ■■■■■■■■ | | | | | |
| Overrun of acceptable pressure force | Claw with fuel assembly moves down | | | | | | ■■■■■■■■ | | | |
| Upper position of a fuel assembly | Claw with fuel assembly moves up | ■■■■■■■■ | | | | | | | | |
| Overrun of bending force | Bridge movement | | | | ■■■■■■■■■■■■ | | | | | |
| | Safety intervals | R17 | R18 | R19 | R21 | | R23 | R26 | R07 | R08 |

FIG. 7

METHOD FOR DETERMINISTIC SAFETY ANALYSIS IN NON-STATIONARY HIGH RISK SYSTEM, CONTROL METHOD AND CONTROL SYSTEM USING THEREOF

RELATED APPLICATIONS

This application is a continuation of PCT/RU2006/000268, filed May 22, 2006, which was published in English and designated the U.S., and claims priority to RU 2005116169 filed May 20, 2005, each of which are included herein by reference.

BACKGROUND

1. Field

The field relates to quantitative safety analysis, in particular, to a method of determining safety factors in high risk non-stationary engineering systems and processes, such as a process of reloading nuclear fuel in a nuclear power plant (APP) and a control system and control method using thereof.

2. Description of Related Technology

Many current modelling systems are designed for performing probabilistic safety analysis solely and provide for the qualitative evaluation of failure probability of the engineering process. According to this approach, safety analysis was usually restricted to the brief characterisation of operating elements called "objects" and possible failures called "initial events", and subsequent functional analysis of probability of one or the other process discontinuity or object damage for a small number of initiating events causing such discontinuity or damage.

Other methods use a deterministic approach which reviews the physical characteristics of a system, for example, temperature, pressure, etc., and evaluates the system solely on the basis of this quantitative information.

Some modelling systems combine a statistical and probabilistic approach to compare the present state of a component with its past history and to determine what could happen next. The current modelling methods do not emphasize an heuristic approach to consider the dynamic interaction between the components of a system or between the systems themselves when determining the present and future performance of a plant.

However, the growing complexity of engineering processes, in particular those connected with exploitation of thermoelectric power stations (TPS) and especially APP, due to a large number of logical and functional relations and time-dependence of safety parameters requires the development of new approaches to safety evaluation.

For example, U.S. patent application 20040086071 discloses an optimum evaluation system for safety analysis of a nuclear power plant, wherein data derived from results of a various kinds of experiments are used to improve codes so that the calculated results do not exceeds the experimental results at any condition, so that a sufficient safety margin is maintained at any condition. The system provides for quantification and standardization of the analysis method to three procedures. A first procedure relates to applying conditions and codes consists of a step for describing an accidental scenario, a step for selecting a subject power plant, a step for confirming main conditions and deciding the raking, a step for selecting an optimum code, a step for arranging documents related with the codes, and a step for deciding applicability of the codes. A second procedure evaluates the codes and deciding displacement of variables consists of: a step for evaluating codes and deciding evaluation matrix related to the displacement decision for the variables, a step for deciding nodding of a power plant, a step for deciding accuracy of the codes and the experiments, a step for analyzing and evaluating a scale effect decision, a step for deciding input variables of a nuclear reactor and their states related with the factors obtained by analyzing uncertainty and sensitivity, a calculating step of sensitivity of a power plant, a step for statistically evaluating uncertainty and a step for deciding a total uncertainty. A third procedure relates to analyzing sensitivity and evaluating uncertainty conducted by a step for evaluating bias which have not been considered in the first and the second procedures to decide a temperature of a final coating material.

This system allows estimating the safety of the existing objects only and cannot provide developing technical specification for the safety measures at the modernization and at the development of the new equipment for APP.

Attempts were made to reduce the problem of safety evaluation to selection of one possible decision of a plurality of decisions stored in a data base, which would be the most appropriate for the case. Thus, according to a method of a computer-aided safety analysis of a nuclear reactor (WO03/005376), functioning of APP is limited within the range of its safe exploitation, which is defined by the following steps:

a) providing the results of previously implemented safety analysis;

b) check up if the range of the safe exploitation of the APP defined earlier is applicable in the new operating conditions of the APP However, this method is applicable to safety analysis of only those APP's, which are already in operation and not to newly constructed or modified APP's.

U.S. Pat. No. 4,632,802 discloses a system for safety evaluation of APP, which provides continuous operation of APP in case of failure or unavailability of one or several APP elements. According to U.S. Pat. No. 4,632,802, the system provides for monitoring and evaluating the degree of risk associated with continued operation of a nuclear power plant while one or more plant components has failed or is otherwise unavailable. The apparatus has several functional sections, including means for storing a plant-specific data base of component-level core damage logic paths and component level failure probabilities, means for selecting plant condition scenarios by modifying the component failure probabilities to represent plant components actually or potentially unavailable, means for associating a figure of merit with the change in risk of core damage resulting from the unavailable components, and means for displaying the figure of merit relative to a base or reference value. As an interactive tool in the plant, the apparatus PSES displays the probability or risk of core damage almost instantly for any given state of plant readiness.

Similarly, the known system can be used for safety evaluation of existing APP and not for the newly developed or modified plants to optimize the APP equipment parameters, like a control system, to choose necessary and sufficient number of protection layers and of locks providing the object safety.

Another method for deterministic safety analysis based on the risk conception (EP1378916) includes ranking of initiating events depending on frequency of their occurrence, the threshold level of frequency of initiating events, acceptance criteria with adjustable level of conservatism, conservatism value using the methodology of the safety analysis, wherein the analysis of the events is performed using deterministic analysis in case the frequency of the event initiation exceeds the threshold level, or probabilistic analysis in case the frequency of the event initiation is below the threshold level.

The known method includes also the identification of the additional system of failures, which are not in a direct relation with initiating events, and definition of the common threshold frequency value for the combination of the initiating events frequency and additional failures frequency. Later the additional system of failures is appended to the safety analysis until the total frequency of event and additional failures does not exceed the threshold frequency level.

While the known method provides determining conditions when either deterministic or probabilistic method, it does not provide for the use of both methods when needed.

Further, EP 0411873 discloses a control system for a plant using a modelling system employing expert, deterministic and probabilistic modelling methods. This modelling system is implemented as a hierarchical structure of independent objects interacting with each other. Each object represents an element or a system. Objects are connected to each other through a data base available for all objects. The structure of the object module and the hierarchical structure are standardized and provide introducing new elements or systems by introduction of standard object modules including specific object model. The object model contains a deterministic model of the element degradation, probabilistic model of the element degradation and expert rules combining deterministic and probabilistic models with experts' knowledge aiming to determine the current state of the object and produce recommendations concerning future actions with respect to the object.

Further, according to international standards, a procedure for probabilistic safety analysis of APP in defined in Procedures for conducting probabilistic safety assessment of nuclear power plants (level 1), International Atomic Energy Agency, Vienna, 1992, STI/PUB/888. According to this standardised procedure, a probabilistic safety analysis of APP includes the following steps: input data acquisition and analysis, selection of input events, determining safety functions, determining functional system interconnection, determining successful functioning criteria, grouping input events, modelling a sequence of events and systems, and performing quantitative and qualitative safety analysis.

The above discussed approaches proved their effectiveness when applicable to stationary, in the context of safety conditions, systems only, wherein safety conditions either invariable or change relatively slowly, for example, as a result of ageing of system elements.

However, many complex engineering systems operate in safety conditions, which are both time and location-dependent and could vary within a single technological operation, as well as in course of a technological cycle, that makes the above discussed safety analysis approaches inapplicable.

The above said relates for example, to technological processes of transportation, which are typically characterized by significant changes in safety conditions both from one technological operation to the other, and within a single technological operation. There is a multitude of logical and functional inter-relations between operations that affect the overall safety of the engineering process.

As a result, known methods and systems become unreliable in case of safety analysis of complex engineering processes such as a process of reloading a nuclear fuel. The non-stationary character of such engineering processes makes impossible a reliable evaluation of safety conditions using the known methods and approaches.

SUMMARY OF CERTAIN INVENTIVE ASPECTS

One aspect is creating a method and a system of safety analysis and evaluation of engineering processes by means of computer-aided probabilistic safety analysis that would provide a quantitative safety evaluation of engineering processes whose safety conditions are time and location dependent and vary constantly, either within a single technological operation or in the course of a technological cycle, or both.

Another aspect is to provide a method of safety analysis, allowing to define valid safety requirements for the structural optimization of an engineering process control system, including determining necessary and sufficient number of protectors and locks, in particular with respect to processes of nuclear fuel reloading.

Another aspect is a method and system to provide for reliable safety evaluation, which is often one of the major factors considered when developing a new engineering process and/or modifying existing plants.

Another aspect is a method and system to further provide for quantitative safety analysis of the engineering process.

Moreover, the method and system may be used in safety analysis of nuclear fuel reloading and other engineering processes with high level of risk.

Definitions

The following definitions will be used throughout the detailed description of the invention and claims:

a process parameter $P_i$ ($1 \le i \le n$) is defined as any measurable physical parameter related to or acting upon an object involved in an engineering process, such as a load, impact, force, such as torque force, or a condition such as temperature, pressure, etc;

maximum safe operation parameter (MSP), $P_{ismax}$ is defined as maximum permissible value of the said parameter in accordance with safety requirements for the engineering process under analysis, further, safety criterion;

overrun of Maximum Safety Parameter (OMSP) is excess of the normal value or abnormal behaviour, such as downfall or break out of an object involved in a process or operation;

failure $F_i=f(P_i)$ of an engineering process is a process malfunction or deviation of process parameter Pi from a normal value;

a risk factor (a source of danger) is defined as such failure $F_i=f(P_i)$ of a high risk technological process, which result in overrun of at least one process parameter $P_i > P_{ipermitted}$;

risk factor zone of action Zi ($F_i=f(P_i > PP_{i/ton})$) is defined as a plurality of parts of engineering process, affected by the said risk factor, including those parts where this particular risk factor arises and causes overrun of the said at least one process parameter as well as a number of down flow parts where consequences of the said risk factor can cause overrun of other process parameters;

safety interval Ri is defined as a sub-plurality of parts of engineering process $R_j=\{F_1, F_2, \ldots F_i, \ldots F_n\}$ ($1 \le j \le m$), wherein a combination of said risk factors $$\sum_{i=1}^{n} F_i$$

remains invariable (constant). According to some embodiments, a method of computer-implemented safety analysis of a high risk engineering process with non-stationary objects characterized by variable risk factors is provided, which comprises the following steps:

a. dividing the said high risk engineering process into safety intervals $Rj=\{F1, F2, F3 \ldots Fn\}$ ($1<n<m$), wherein the safety interval is a series of at least one process stage where a combination $$\sum_{i=1}^{n} F_i$$

of risk factors remains invariable for all stages of the said series; and b. for each safety interval, creating a safety model and performing qualitative and quantitative safety analysis.

Prior to these steps, the method possibly includes a step of collecting process-specific data. Also, the method comprises creating a computer readable representation of a high risk engineering process based on the collected or available data, which could be in the form of tables, charts, and any other form of computer readable data.

Further, the method may comprise analysis of the obtained process-specific data, using the computer readable representation, with respect to safety regulations to determine safety criteria.

Further, the step of modelling may comprise creating a deterministic safety model, while the qualitative and quantitative safety analysis comprises at least a step of calculating risk factors probabilities.

Further, it is appreciated that safety criteria are defined in terms of maximum safe operation parameters including process parameters and/or forces acting upon objects Bi involved in the said process. The maximum safe operation parameter $P_{isafe}$ is defined as maximum permissible value of the said parameter in accordance with safety regulations for the given engineering process.

Further, prior to analysis, potential risk factors can be determined based upon analysis of engineering process, wherein the risk factors are defined above as such engineering process and operation parameters failures, which may result in at least one overrun of the said maximum safe operation parameters;

Further, to define safety intervals of the engineering process as intervals wherein safety conditions remain invariable, prior to safety analysis, a distribution analysis of the above defined risk factors throughout different stages of the said engineering process can be performed, e.g. using a process representation in computer readable form;

Further, upon distribution analysis, sequential transition of failures of the said engineering process and operation parameters from one to another safety interval are analysed using cause-effect analysis; and, finally, at least one deterministic safety model is developed based on analysis of possible scenarios of sequential transitions of engineering process failures from one to another safety interval.

Further analysis and safety evaluation can be implemented using at least one operation of the following sequence of operations:

creating at least one of logical and logical-probabilistic model for each process failure, which results in overrun of at least one process parameter, wherein the said model is created based on the analysis of possible events resulting in respective failures of the engineering process;

based on analysis of non-stationary safety conditions and propagation of risk factors in each stage/part of an engineering process, in particular by creating a diagram process partitioned into safety intervals, switching to analysis of stationary safety analysis;

creating a deterministic model of safety intervals, taking into consideration possible scenarios of transition of failures from one to another safety interval.

Based on the obtained deterministic models of safety intervals as described above and taking into consideration possible scenarios and logical-probabilistic models of occurrence of failures in the engineering process, deterministic-probabilistic safety models are further created for the whole engineering process.

One of the specific features of the claimed method is the analysis of cause-effect relations between risk factors, possible failures in the engineering process and the function of protections and locks at each stage of the engineering process.

As risk factors, one should consider failures in the engineering process, which may result in overruns of normative impact on the units, components of units (devices), and other objects, when these input actions are subject to safety regulations established for the given engineering process.

Another feature of the method is that the analysis of propagation of areas of influence of risk factors may be performed by analysing each separate stage/part of a technological operation, and defining those risk factors that result in at least one overrun of the input action.

The method may include creating logical-probabilistic models of possible failures in the engineering process, where each initial event is considered with the probability of its occurrence obtained based on the analysis of statistical data for the given engineering process.

It shall be appreciated that, when performing safety analysis and evaluation of an engineering process, objects subject to safety evaluation includes non-stationary objects, such as the engineering process as a whole, stages of engineering process, products, devices, units of devices, which are characterised by safety conditions varying in time and allocation of the given product, unit or device, in particular, depending on which stage of the engineering process a given product, unit or device is allocated.

Based on the analysis of sequential propagation of risk factors throughout the engineering process, it is possible to switch from consideration of an engineering process as a non-stationary object to the consideration of stationary parts of the engineering process, that simplifies greatly and contributes to the reliability of the method of safety analysis.

By performing quantitative safety analysis of the engineering process it is possible to determine the necessary and sufficient quantity of protectors and locks.

Additionally, based on the results of safety analysis and evaluation, a control system can be further optimized, so that valid reliability parameters of equipment could be determined.

Some aspects can be further implemented in a system for safety analysis and evaluation of an engineering process, the system comprising:

a central processor for performing the safety analysis and evaluation of engineering process;

a storage means for storing engineering process-specific data;

a modelling means for modelling of engineering process; and a computation means for calculation of probabilistic safety parameter, wherein the storage means stores process-specific data for further analysis of safety regulations based on which data a list of safety criteria and a list of risk factors defined in terms of overruns of maximum safe operation parameters are created; and possibly, other data used as a basis for analysis of failures in engineering process, and for development of a list of failures in engineering process that result in maximum safe operation parameters overruns;

wherein the system further comprises:

a means for analysis of risk factors distribution areas and partitioning of engineering process into safety intervals, for which safety conditions remain invariable; and a means for analysing transitions of engineering process failures from one safety interval to another by means of cause-effect analysis;

wherein the modelling means comprises means for creating deterministic safety models taking into consideration possible scenarios of transitions of engineering process failures from one to another safety interval; and the computation means are implemented so as to enable calculation of indices for at least individual types of events.

In some embodiments, a system further comprises a means for creating a verbal model of an engineering process, the verbal model comprising the description of operating conditions and safety parameters.

Further, the system may comprise a means for creating a deterministic-probabilistic model.

Further, a system may comprise means for calculating probabilistic safety indices.

Further, a system may comprise means for analysis of safety indices characterizing the contribution of separate technological operations, protectors and locks into a composite safety index of the engineering process of nuclear fuel reloading.

Further, the system may comprise means for creating and selecting scenarios of development of failures within the engineering process using statistic data on the probabilities of occurrence of different events for the given engineering process, stored in a database.

Further, the system may comprise means for creating a diagram of an engineering process, means for compiling a list of failures in an engineering process, a list of initial failures and a list of protectors and locks.

Other features and characteristics of the claimed method and system for safety evaluation are described in more details below by the example of a method and system for safety evaluation of the process of the nuclear fuel reloading with references to the figures attached.

It shall be also appreciated that the below example of implementation should not be treated as limiting the invention, while the method and system as claimed in the appended claims may be used for safety analysis and evaluation of any engineering process where it may be required.

BRIEF DESCRIPTION OF THE DRAWINGS

FIG. 1—a schematic diagram illustrating different stages of a technological operation "an installation of a fuel assembly into a reactor";

FIGS. 3A and 3B, collectively referred to as FIG. 3—a deterministic model of a transporting-technological operation 'the installation of a fuel assembly into a reactor';

FIG. 7—diagram showing how the operation of "re-loading of fuel cell into a nuclear reactor" is splitted into safety intervals;

DETAILED DESCRIPTION OF CERTAIN INVENTIVE EMBODIMENTS

Figure 2:
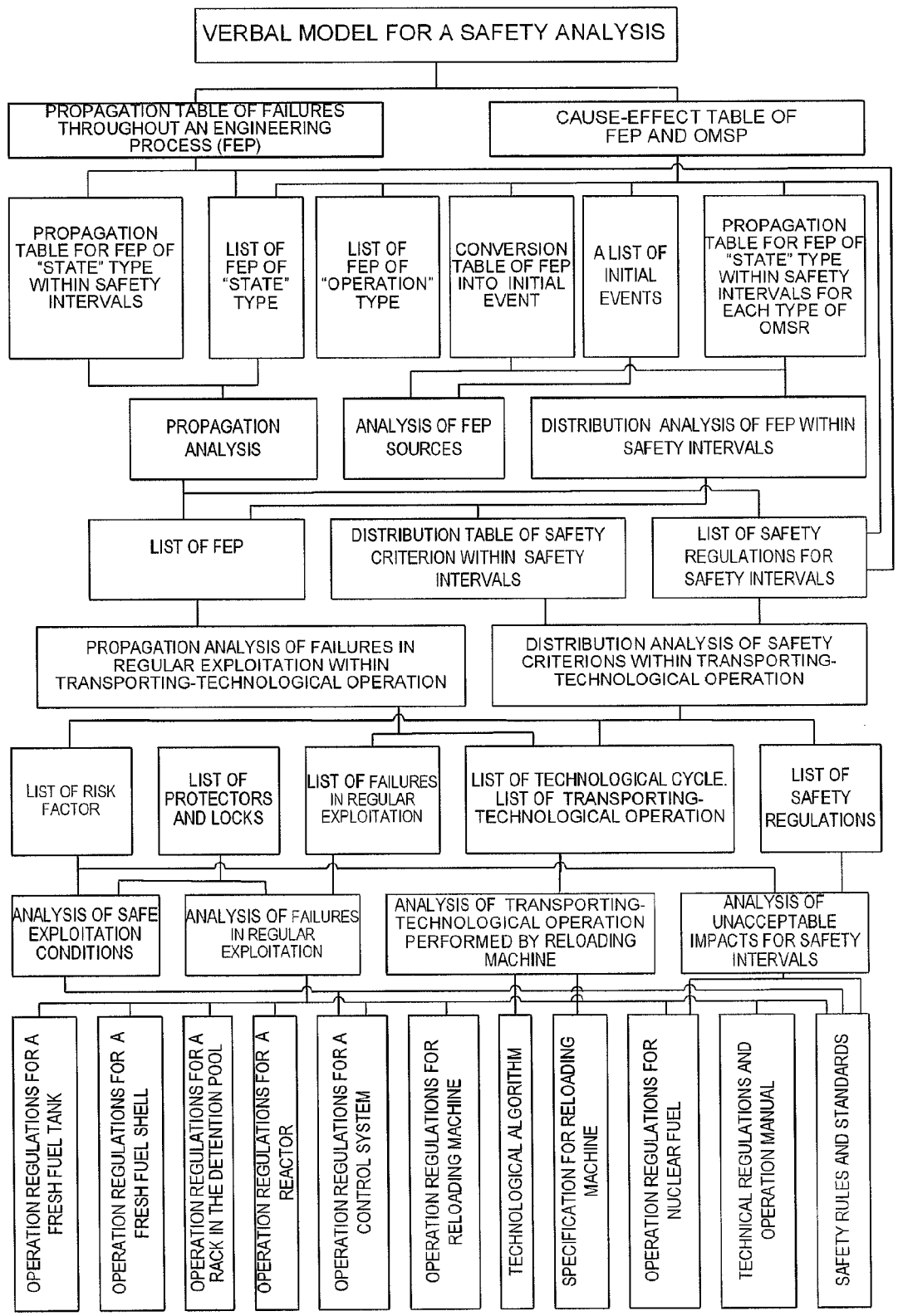
FIG. 2—a verbal model for a safety analysis of an engineering process.

Certain embodiments will be further illustrated with reference to an example of a system for safety analysis and evaluation of an engineering process of reloading a core region of a nuclear reactor WWER (Water/Water-Energy Reactor)-1000, designed by the Russian Kurchatov Institute, Moscow.

The safety analysis of an engineering process for refuelling a core region is implemented using a system for deterministic safety analysis of an engineering process, wherein the system comprises a central processor for performing safety analysis of an engineering process, a means for storing engineering process data, and a means for computation of probabilistic safety factors (indices) for each type of event and a cumulative safety index for the overall process.

A data storage means comprises both (i) information relating to industry standards and normative technical documentation, such as process-specific safety regulations, which is used as initial data for creating a list of safety criteria, and (ii) a list of actual overruns of acceptable safety parameters for the current nuclear power plant, engineering process or technological operation, to use in analysis of possible failures of the engineering process and for compilation of a list of failures that result in possible occurrence of OMSP.

Further, optionally, a system contains a means for creating a verbal model of an engineering process, including description of operating conditions and limits, a means for creating a deterministic-probabilistic safety model, a means for calculation of probabilistic safety indices, a means for creating a logic-probabilistic model and other calculation means.

The safety analysis and evaluation procedure comprises the following sequence of operations.

At the first stage, initial data is collected, including normative-technical and exploitation documentation for a reloading machine, a control system, a product to be reloaded, engineering algorithms, a service area diagram, transporting-technological operations diagram and other required documents.

At the second stage, the input information is analysed to generate the following interim documents, including but not limited to:

1. A Schematic Block Diagram of an Engineering Process

This diagram is typically represented as a multi-level structure illustrating a process of reloading a core region of a reactor, in combination with associated technological cycles and transporting-technological operations. The reloading process is represented as a sequence of technological cycles, wherein a list of cycles is defined on the basis of technical specification of a reloading machine, such as MPS-V-1000 U4.2 in the current example implementation.

According to the example, a process of reloading consists of 22 types of technological cycles with fuel assemblies, including the steps of: blowing up the assembly, inspection of installation level of the fuel assembly in the reactor, inspection of nests for installation of fuel assemblies in the reactor; 5 types of technological cycles involving elements affecting functionality (clusters), 4 types of technological cycles involving operations with plugs of a hermetical case.

Each technological cycle consists of a predetermined number of transporting-technological operations. For instance, according to the present example, the process includes 11 types of transporting-technological operations with fuel assemblies, 4 types of transporting-technological operations with clusters, and 2 types of transporting-technological operations with the plug of hermetical case.

2. A List of Safety Criteria

The safety criteria throughout the current specification are defined as Maximum Acceptable Safety Parameters of normative impacts on a reloaded product (also, Maximum Safe Operation Parameter $P_{imax}$, see Definitions).

An overrun of the acceptable parameter is the failure consisting in that normative impact as defined by the safety regulations is exceeded. For different kinds of impacts to the reloaded product, different safety parameters could apply. Therefore, the safety criterion would be non-deviation from normative impacts to a given object, such as a reloaded product.

The safety criteria are determined upon analysis of Standard Norms and Rules, and exploitation documents of the nuclear fuel.

The approximate list of safety criteria at the reloading of the core region of the reactor (handling fuel assemblies) is shown in the Table 1.

TABLE 1

| Type of impact | Safety criteria, Maximum Safe Operation Parameter ($MSP_{ismax}$) | Safety Regulations |
|---|---|---|
| Downfall of a fuel assembly | Fuel assembly downfall is not permitted | Article 4.2.8 of the "Safety regulations for storage and transportation of a nuclear fuel in a nuclear power engineering apparatuses" PNAE G-14-029-91 |
| Torsion torque | Torsion torque is not permitted | Article 8.2.7 of the operating manual "Complex of cassettes WWER-1000" 0401.22.00.000RE |
| Side blow | Hitting a beam of a reloading machine when transporting fuel assemblies, by a construction elements of a reactor or a detention pool is not permitted | Article 6.5.11 of the "Safety regulations for storage and transportation of nuclear fuel in nuclear power engineering apparatuses" PNAE G-14-029-91 |
| Removal/Mounting Force | Force of removal must not exceed 2205 N. Mounting force must not exceed 735 N | Article 8.2.4 of the operating manual "A complex of cassettes WWER-1000" 0401.22.00.000RE |
| Pinch force | Pinch Force must not exceed 9800 N | Article 8.2.3 of the operating manual "A complex of cassettes VVER-1000" 0401.22.00.000RE |
| Upper extreme position of a fuel assembly | A used fuel assembly should not be elevated above a marker showing a water layer sufficient to provide safety of personnel engaged in reloading of nuclear fuel | Article 6.5.11 of "Safety rugulations for storage and transportation of nuclear fuel in nuclear power engineering apparatuses" PNAE G-14-029-91 |
| Bending force | Bending force is not permitted | Article 6.5.11 of "Safety regulations for storage and transportation of nuclear fuel in nuclear power engineering apparatuses" PNAE G-14-029-91 |
| Tensile load | Maximum acceptable tensile load applicable for removal of a fuel assembly from a reactor must not exceed 39200 N for initial 40 mm | Article 8.2.5 of the operating manual "Complex of cassettes VVER-1000" 0401.22.00.000RE |
| Fuel assembly self-destruction | Reloading of a fuel assembly with mechanical defects (breakage of details or parts of units) is not permitted | Article 10.6 of the operating manual "Complex of cassettes VVER-1000" 0401.22.00.000RE |
| Overheating of a | Reloading of a fuel assembly | Article 4.2.11 of "Safety |

TABLE 1-continued

| Type of impact | Safety criteria, Maximum Safe Operation Parameter ($MSP_{ismax}$) | Safety Regulations |
|---|---|---|
| fuel assembly | at the decreased water level in the detention pool is not permitted | regulations for storage and transportation of nuclear fuel in nuclear power engineering apparatuses" PNAE G-14-029-91 |

3. The next step is defining a list of failures in the engineering process and operation conditions that may result in OMSP (overrun of the maximum safety parameter), and hence, may constitute a Risk Factor, where risk factor is defined as such failure $F_i=f(P_i)$ of a high risk technological process, which results in overrun of at least one process parameter $P_i > P_{ipermitted}$.

Herein, failures in the engineering process in the step of core region reloading are defined as failures in regular exploitation, including, but not limited to the following:

Unapproved movement of machinery
Unapproved speed of movement of machinery
Unapproved direction of movement of machinery
Error in positioning of machinery to prescribed coordinates
Positioning of machinery to non-prescribed location
Positioning of a reloaded product to/on a prescribed location
Presence of unauthorized objects in a reloaded products area
Deviation in dimensions of reloaded products
Power supply loss
Seismic impact, etc.

In general, engineering process failures could be separated into two groups:

Operation failures; for instance, unapproved movement of a shell;
Status failures; for instance, the fuel assembly claw is positioned in the intermediate state.

The total number of failures of the engineering process that will be considered within the present process is 55, including 16 failures relating to status failures.

4. Partitioning Diagram Showing how Transporting-Technological Operations could be Partitioned into Intervals with Invariable Safety Conditions The next stage is creating a diagram of partitioning of transporting-technological operations into intervals with invariable safety conditions.

Further, a process of partitioning transport-technological operations into intervals with invariable safety conditions will be discussed in more detail with reference to the operation "Installation of a fuel assembly into a nuclear reactor".

The first step is compiling a table containing data relating to OMSP, respective risk factors, and areas of influence of risk factors. The area of influence is defined as a part of a technological operation where a particular risk factor may result in unacceptable impacts. An example table may be presented as shown below (for some safety criteria)

TABLE 2

| OMSP, Overrun of Maximum Safety Parameter, or Overrun of Safety Criterion | Risk factor, $F_i = f(P_i)$ | Area of influence of a risk factor $F_i$ |
|---|---|---|
| Fuel assembly downfall (OMSP1) | Unauthorized fuel assembly gripper opening | Initial position corresponds to - the transporting position with a fuel assembly. End position is defined as a position when a shank of a fuel assembly is located within 100 mm from the installation position |
| Torque (OMSP2) | Unauthorized pivot of a working beam | Initial position is defined as a position when the shank of a fuel assembly is located at a head level of the installed fuel assemblies. End position corresponds to position when the fuel assembly is installed into a reactor slot |
| Pinch force (OMSP5) | A claw with a fuel assembly moves downward at the unapproved speed | Initial position corresponds to position when a fuel assembly shank is within 100 mm distance from the target location in a slot of a reactor. End position corresponds to position when the fuel assembly is installed into a slot of a reactor. |

Further, a procedure is described for compiling a diagram of distribution of areas of influence of risk factors.

First, an engineering process is presented on a diagram in the following system of coordinates:

on the horizontal axis, initial and endpoints of influence of risk factors are marked;
on the vertical axis, points corresponding to possible types of damage are marked.

Then, for each risk factor, an influence area is marked by a horizontal line. Further, initial and end points of obtained influence areas (they are shown by dotted lines) are connected by vertical lines to separate the whole technological operation into intervals, where the safety conditions remain invariable, for instance, the number and types of possible damages of fuel assemblies is constant.

The obtained safety intervals represent stationary, in the context of safety conditions, objects, where standard methods of calculation of probabilistic safety analysis are applicable.

In this way, the whole engineering process can be represented as a set of sequentially connected safety intervals. In this representation, safety intervals are connected to each other not only by a sequence of technological operations, but also by cause-and-effect relations of engineering process failures, which could happen within these intervals.

5. Table 3 "Propagation of Failures"

This table is compiled based on analysis of failure transitions from one safety interval to another.

A characteristic feature of multiple transporting-technological operations, in particular, nuclear fuel reloading operations, is that if a failure has occurred on some safety interval in the course of an engineering process, this may or may not result in the overrun of maximum safety impact on a reloaded product at this interval. For instance, if a failure has occurred on a safety interval when a fuel assembly was moved to a transit position, the result could be that a fuel assembly is not lifted to the required level, its lower part projecting outwards from the working beam. Within the given safety interval this failure may not result in a fuel assembly damage, however, later, when the fuel assembly will be moved through a transporting passage, it may be curved by collision with structures in the transporting passage.

To avoid the above described failures, propagation of failures shall be traced and analysed throughout the engineering process shall be made. To simplify analysis of failures transitions from one safety interval to another, the next step is compiling "A table of failures propagation throughout an engineering process" (further referenced as Failure Propagation Rules).

As a result of the analysis, a combined table of failures is compiled, where all possible failures in engineering process and all safety intervals for a given operation are listed. This table is compiled using Failure Propagation Rules developed earlier. An example table for the first three intervals of the operation "Installation of a fuel assembly" is presented below.

TABLE 3

| Failure designation | Description of failure | Safety Interval R1.15 | | Safety Interval R1.16 | | Safety Interval R1.17 | | ... |
|---|---|---|---|---|---|---|---|---|
| | | In | Out | In | Out | In | Out | |
| Failure 2.1.6.1 | The shell is out of required coordinates of installation/removal of a fuel assembly | + | × | + | + | × | + | + | 2 | − |
| Failure 2.2.6.1 | The trolley is out of required coordinates of installation/removal of a fuel assembly | + | × | + | + | × | + | + | 2 | − |
| Failure 2.2.6.2 | The trolley is out of required coordinates of the transporting passage entrance | − | 4 | − | − | 4 | − | − | 4 | − |
| Failure 2.4.7.1 | The claw with the fuel assembly is above the transit position | + | 1 | − | − | 1 | − | − | 1 | − |
| Failure 2.4.7.2 | The claw with the fuel assembly is below the transit position | + | 1 | − | − | 1 | − | − | 1 | − |
| Failure 2.4.7.3 | The claw with a picked up fuel assembly is "in the transit position with the product" | − | 4 | − | − | 4 | − | − | 4 | − |
| Failure 2.4.7.4 | The claw is not on the required coordinates of installation/removal of the fuel assembly (by the height) | − | 4 | − | − | 4 | − | − | − | − |
| Failure 2.5.7.1 | Discrepancy between the actual and required position of the claw - it is open | − | 2 | − | − | 2 | − | − | 3 | − |
| Failure 2.5.7.2 | Discrepancy between actual and required position of the claw - it is closed | − | 4 | − | − | 4 | − | − | 4 | − |
| Failure 2.5.7.3 | The claw latch is in the intermediate position | + | × | + | + | × | + | + | × | + |
| Failure 2.7.7.1 | The working beam is not at zero degrees position (required position) | + | × | + | + | × | + | + | × | + |
| Failure 2.7.7.2 | The working beam is not at 45 degrees position (required position) | − | 4 | − | − | 4 | − | − | 4 | − |
| Failure 10 | The fuel assembly is installed out of the reactor slot | − | 4 | − | − | 4 | − | − | − | − |
| Etc. | | | | | | | | | |

In the above table, the symbols "+" and "−" denote, respectively, the presence and absence of potential failure at the beginning or at the end of a safety interval, while the numbers "1" . . . "6" correspond to the number of a failure propagation rule for a given engineering process. Example rules presented below.

Rule 1: The influence of a failure is terminated at the moment of a regular movement of machinery. For instance, the influence of the failure "Error of setting the shell to the required coordinates" is terminated as soon as the shell start moving regularly.

Rule 2: A potential failure in the engineering process is eliminated provided a safety interval is realized in accordance with the engineering process. For instance, installation of a fuel assembly into a reactor slot eliminates the influence of the following failures: "The working beam is not at 0 degrees position" and "The bridge or trolley are out of coordinates of installation/extraction of the reloaded product", etc.

Rule 3: The influence of a failure in the engineering process is terminated upon unconditional conversion of failure into an overrun of a safety parameter. For instance, unapproved opening of a fuel assembly claw during transportation of a fuel assembly (this is a failure) unconditionally results in the fuel assembly drop (this is an overrun of a safety parameter).

Rule 4: A failure in the engineering process terminates its influence in a safety interval where this failure does not appear as a failure for a given safety interval. For instance, the influence of a failure "A claw is open" is terminated when the claw is back to a correct position.

Rule 5: The influence of a failure in the engineering process is not considered if it does not allow performing a regular technological operation, but does not result in overrun of an acceptable impact. For instance, if a claw moves downward in the position "The claw is closed", thought landing of the claw onto a fuel assembly is impossible, this does not create a condition for the fuel assembly damage.

Rule 6: Engineering process failures relating to failures of the regular exploitation (unauthorized objects, deviation of geometrical sizes of a service area or reloaded products, etc.) are considered as acting if the start affecting the safety of an engineering process. For instance, an unauthorized object allocated in a reactor slot is not considered as a failure in the engineering process unless a fuel assembly is installed in a reactor slot where this object is allocated. The presence of an unauthorized object in a slot may result in failure in the installation of the fuel assembly in the correct position, and later this may result in the fall of the fuel assembly.

Further, on the basis of the documents described above a verbal model is created for future use in safety analysis of the engineering process.

On the third stage, the simulation of the engineering process is performed as follows.

Figure 3B:
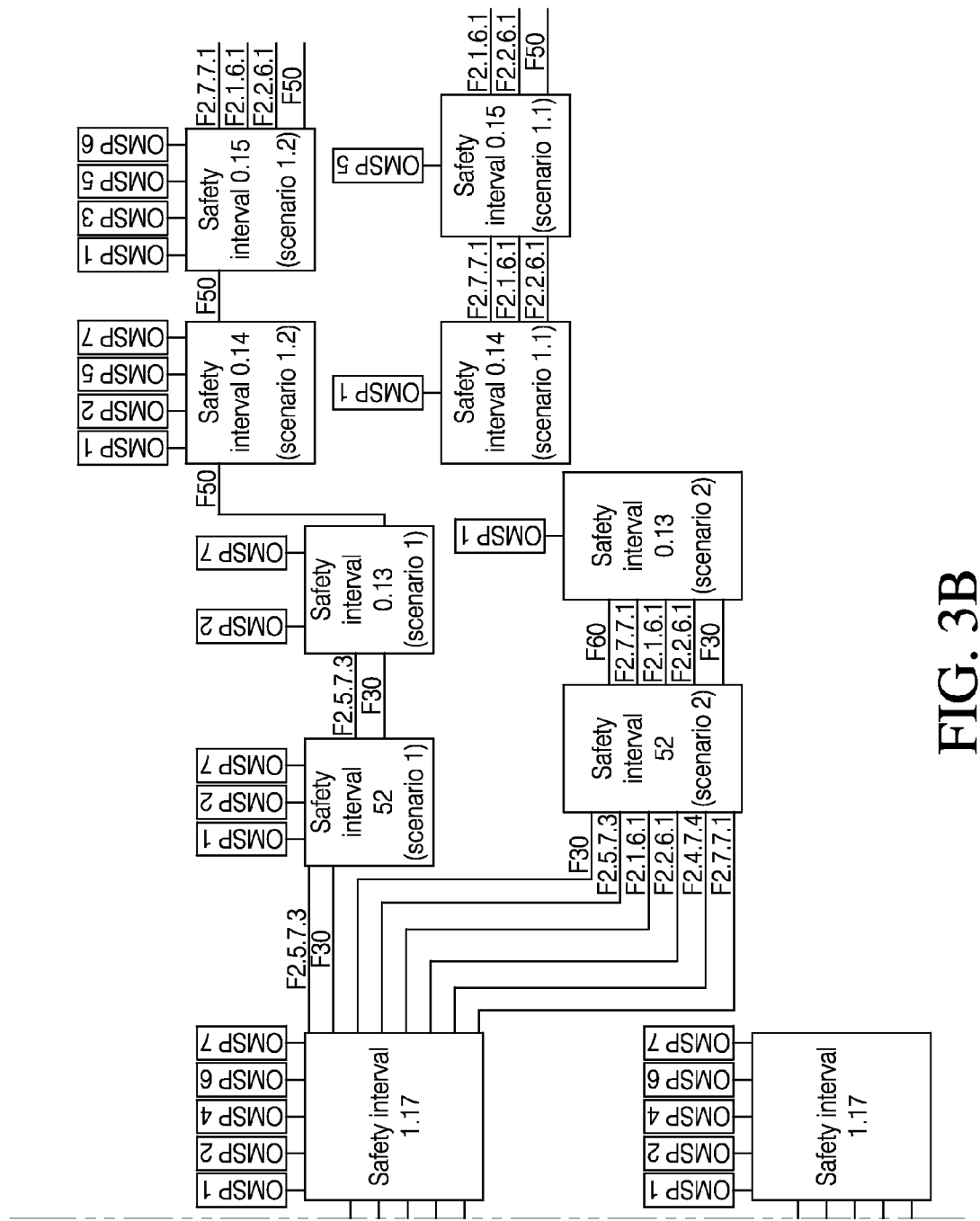

Using the propagation table obtained earlier, a deterministic-probabilistic model of a technological operation is constructed, taking into consideration possible transitions of failures to subsequent safety intervals (FIG. 3). This model represents a combination of safety intervals. At this stage, failures are considered that occur in a given safety interval, and those failures in the engineering process (FEP) that were transferred from a previous interval and resulted in overruns of accepted impacts at this interval or may result in overruns at the subsequent intervals.

The above model takes into consideration all possible scenarios and paths of events development to provide a qualitative safety evaluation of a technological operation. The results of this analysis may be used either as such or for subsequent quantitative safety evaluation of the engineering process.

Figure 4:
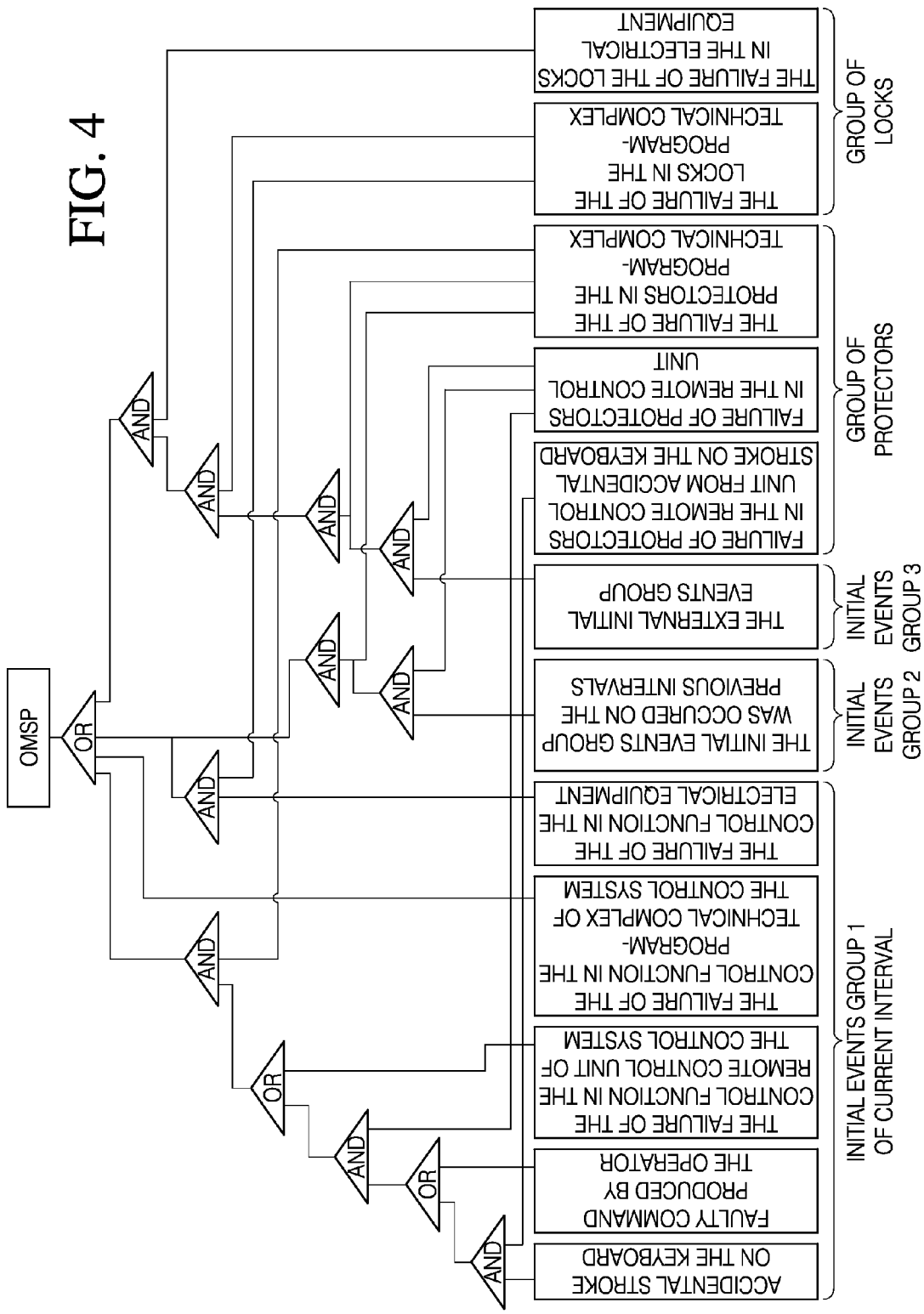
FIG. 4—a typical logical-probabilistic model of occurrence of an overrun of a maximum safety parameter (OMSP, Overrun of Maximum Safety Parameter), such as an acceptable safety impact.

The next step is creating logical or logical-probabilistic models describing processes of initiation of OMSP for each safety interval (FIG. 4). At this stage, those failures in the engineering process (FEP) are considered that occur within the current safety interval or have propagated from a previous interval and resulted in OMSP (e.g. resulted in overrun of acceptable impact) in a given interval. Further, external impacts and protectors and locks available in the given safety interval are considered. To obtain quantitative indices, each failure in the engineering process (FEP) or failures of protectors and locks are taken into consideration with the respective probability of their occurrence.

The following events may be considered as an initiating impact: accidental stroke on the keyboard, faulty command produced by an operator, a control function failure in the remote control unit of a control system, a failure of a control function in a program-technical complex of a control system, a failure of a control function in electrical equipment.

The following events may be considered as an external impact: equipment failures (e.g. a reloading machine or its control system), exploitation personnel errors, deviation of geometric sizes of reloaded products of designed values, deviation of geometric sizes of designed values: reactor slots for fuel assemblies, rack cells in a detention pool, shells for fresh fuel and containers for used fuel; unauthorized objects located in a service area; water level decrease as a result of water flow through a coating of a detention pool; complete termination of power supply; seismic impact.

Protectors and locks may include, for instance, protectors and locks in a control system of a reloading machine. Protectors and locks can be separated into two groups: common protectors and locks, and protectors and locks of each device of a reloading machine.

Protectors and locks within the control system can be classified into the following groups in accordance with their mode of action:

Remote control unit—protectors;

Program-technical complex—protectors and locks;

Power supply complex—protectors and locks.

The advantage of the above method of distribution of protectors and locks is that it providing echeloning of protection and also, certain protectors and locks they can be combined independently to provide the required conditions of safe exploitation.

Depending on objectives and tasks of a safety analysis, various modifications and combinations of the above described models are possible within the scope of the appended claims, including deterministic models of operations and logical-probabilistic models of failures in engineering processes.

Figure 5:
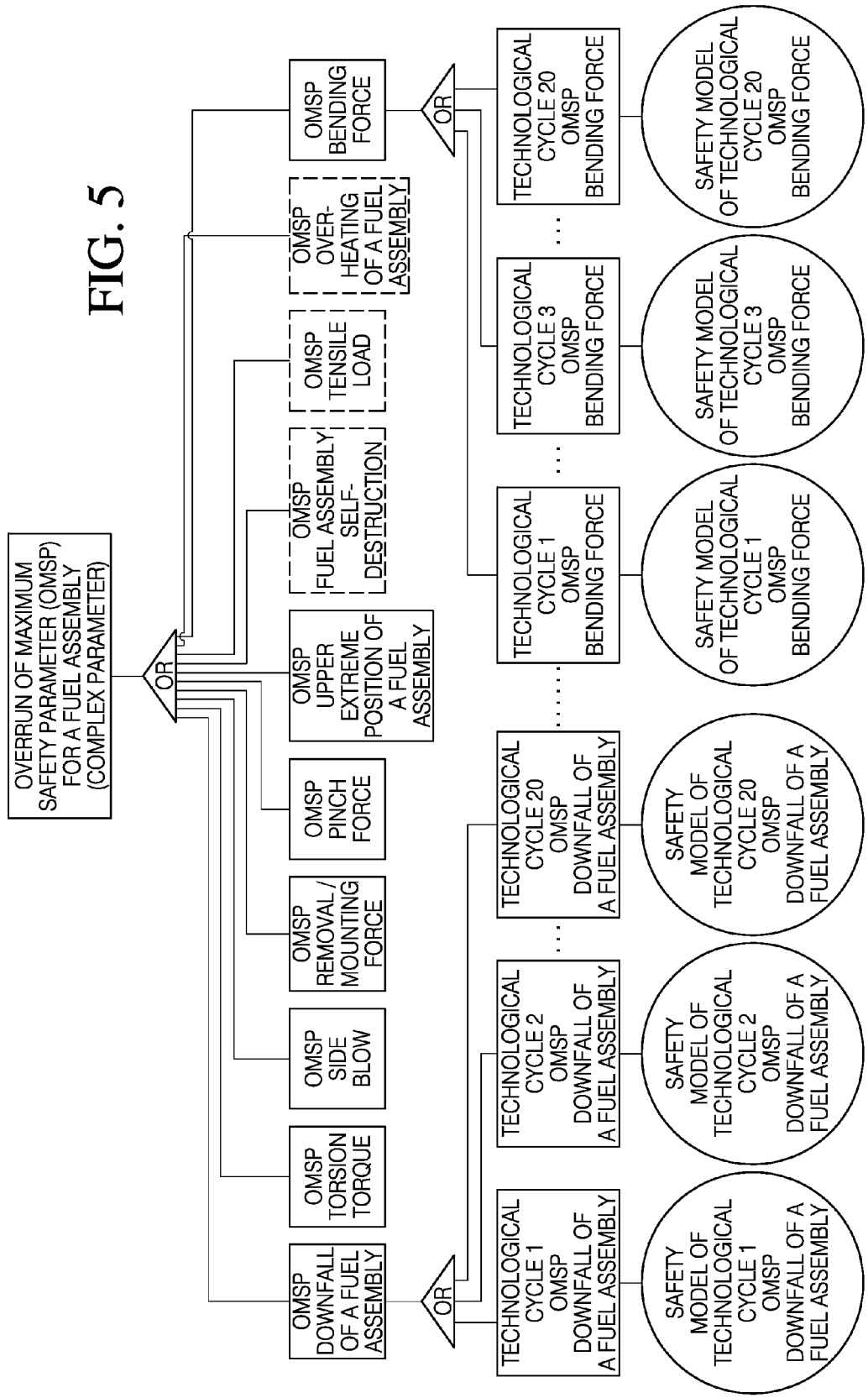
FIG. 5—a deterministic-probabilistic model of a process of nuclear fuel reloading.

For example, a technological cycle can be modelled by combining deterministic-probabilistic models of sequential technological operations, with subsequent modelling a whole process of reloading of a core region of the reactor (FIG. 5).

A model of a reloading process provides the opportunity to determine a combined safety index along with quantitative safety indices for each safety criterion.

On the fourth step, probabilistic safety indices of a core region reloading are calculated using the certified calculation complex "Risk Spectrum Professional".

Calculation of quantitative probabilistic safety indices (safety criteria) is implemented as the following steps:

input of model data relating to a reloading process into a calculation complex;

possible failures are assigned a respective probabilistic coefficients;

protectors and locks are assigned their respective reliability coefficients;

calculations and analysis is performed;

results of calculations of probabilistic safety indices for the transport-technological operation "Installation of fuel assembly" are output;

results of analysis of influence of protectors and locks on the probabilistic safety indices are output.

On the fifth stage, safety indices characterising contribution of individual transport-technological operations and individual protectors and locks to the aggregate safety index of the engineering process of the core region reloading are analysed.

On the sixth stage, the proposals and recommendations are developed to improve the construction and circuit solutions of a reloading machine and its control system.

On the seventh stage, recommendations are developed to increase the safety level of APP when performing transport-technological operations with nuclear fuel.

A method for deterministic quantitative safety analysis of a nuclear power generating system is described below in more detail by way of the following example embodiment.

In the following example embodiment, the method is run in a Windows NT environment or simply on a stand alone computer system having a CPU, memory, and user interfaces. The method can also form a part of a nuclear power plant control system.

The said non-limiting example implementation describes an engineering process of nuclear fuel re-loading in a so-called boiling water (BWR) type nuclear reactor, in particular, in WWER (Water/Water-Energy Reactor)-1000 designed by the Russian Kurchatov Institute, Moscow, and also a control system and control method using the same.

A nuclear reactor re-loading module according to the example comprises a reloading machine (RM), a control system CS, a re-loading zone (reactor), and re-loaded articles (fuel assemblies), each of these components being considered with account of various phenomena which constitute "initiating events" and include but are not limited to: possible failures of a re-loading process, equipment faults, deviations of geometric sizes of reloaded assemblies from the standard ones, possible staff failures etc.

Figure 6:
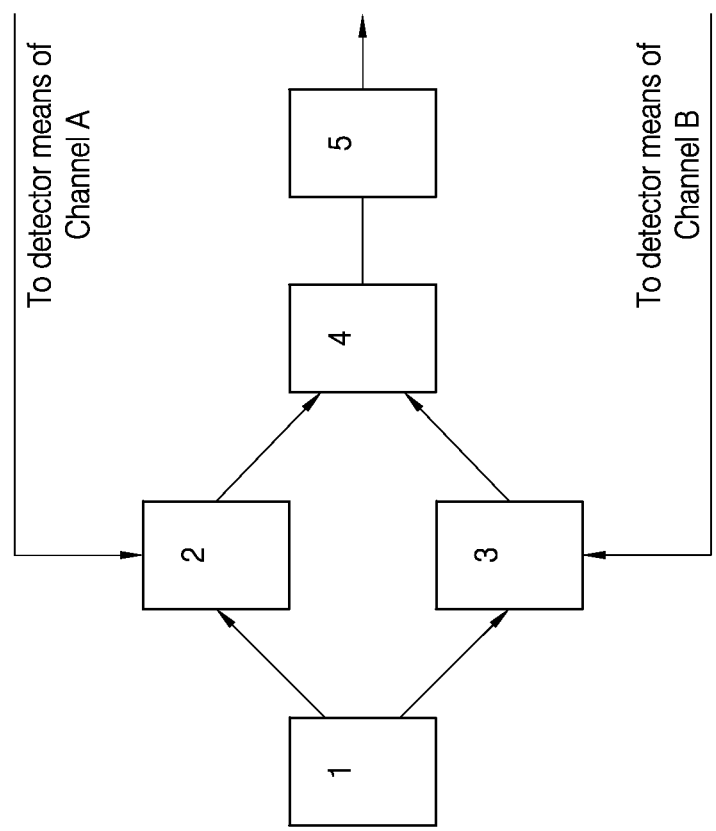
FIG. 6—enlarged block scheme of a control system for controlling a re-loading machine.

FIG. 6 is a schematic diagram of a control system for a re-loading machine. The control system comprises a remote control unit 1, a programmable software and hardware unit 2 of channel A, a programmable software and hardware unit 3 of channel B, a logics 4, electrical equipment unit 5 for controlling executive mechanisms, detector means (not shown) in channels A and B.

In the present example, one type of OMSP, namely, "fall down of a fuel assembly" (see Tabl.1), is considered, and respectively, the probability of the initiating event "fall down of the fuel assembly" is estimated in the operation "Installation of a fuel assembly into a nuclear reactor".

In the first step, a detailed analysis of a re-loading process is made based on normative-technical documentation and data relating to process parameters, or impacts $P_i$ ($1 \leq i \leq n$) (see Definitions) acting upon objects involved in this particular operation "installation of a fuel assembly into a reactor", wherein data may be those obtained from detectors of a control system shown in FIG. 6. Based on the results of the analysis, possible reasons and conditions giving rise to OMSP for each safety criterion (MSP$_{safe}$) $P_{isafe}$ are summarized in a table, such as Table 4.

TABLE 4

| OMSP (Overrun of Maximum Safety Parameter, or Overrun of Safety Criterion) | Risk factor, $F_i = f(P_i)$ | Condition initiating OMSP |
| --- | --- | --- |
| Fuel assembly downfall (OMSP$_{1safe}$) | Unauthorized fuel assembly gripper opening at the step of transporting the fuel assembly | Fall down can occur in case the tail of the fuel assembly is positioned more than 50 mm above the installation level |
| | Transportation of a fuel assembly in the state when the gripper is not fully closed | Fall down can occur as result of spontaneous opening of an assembly gripper, when the fuel assembly is transported on either vertical, or horizontal parts of an engineering process, or both |
| | Unauthorised opening of the assembly gripper upon installation of a fuel assembly in the wrong position | Fall down can occur at the time when the fuel assembly "slips" from the gripper |
| | Transportation of the fuel assembly "picked-up" as result: gripper wedging at the time when the fuel assembly is downloaded, or the gripper slips from assembly head; non-complete gripper opening | Fall down of a picked-up fuel assembly can occur spontaneously on either vertical or horizontal parts of an engineering process, or both |
| | Break of a gripper sling Break down of electric chain of the griper Break down of electric chain of a gripper transportation mechanism | Fall down can occur in case the tail of the fuel assembly is positioned more than 50 mm above the installation level |

Based on the above data a lits of possible OMSP=f($P_i$) is created, where additionally, operating conditions are indicated, which can directly cause OMSP on the operation "installation of a fule assembly into a reactor", i.e. those OMSP, for which a condition $P_i > P P_{i,\text{доп}}$, is true, as shown in Table 5.

TABLE 5

| OMSP number | OMSP description |
|---|---|
| F06 | Bridge is positioned in the incorrect coordinates |
| F12 | Cart is positioned in the incorrect coordinates |
| F19 | Unauthorised transportation of a fuel assembly gripper above the required coordinates for installation of the fuel assembly |
| F20 | Transportation of a fuel assembly gripper while the lock of the gripper is in intermediate position |
| F31 | Stop over of a gripper in the intermediate position |
| F33 | Non complete opening of a fuel assembly gripper |
| F34 | Non complete closing of a fuel assembly gripper |
| F40 | Bridge is positioned in coordinates other than those required for installation of a fuel assembly |
| F41 | Cart is positioned in coordinates other than those required for installation of a fuel assembly |
| F46 | A fuel assembly gripper is positioned in (height) coordinates other than those required for installation of a fuel assembly |
| F52 | Gripper lock is in the intermediate position |
| F55 | Fuel assembly is not in the reactor receptacle as result of transportation into incorrect (horizontal) coordinates |
| F56 | Fuel assembly installed not in the reactor receptacle due to installation machine failure (horizontal) |
| F57 | Unauthorised gripper opening while the gripper is incorrectly installed (vertically) |
| F64 | Transportation of mechanisms while the gripper with the fuel assembly is wedged |
| F66 | Transportation of picked up fuel assembly upflow the engineering process |
| F67 | Transportation of a fuel assembly gripper while the fuel assembly is picked up |
| F68 | Unauthorised griper opening while the fuel assembly is installed in incorrect (horizontal) coordinates |
| F73 | Hindrance for movement of a fuel assembly, due to failures of mechanisms and operation conditions |
| F75 | Hindrance for movement of a fuel assembly during installation, due to deviation of the installed fuel assembly from vertical position |
| F76 | Hindrance for installation a fuel assembly in a reactor receptacle due to another assembly is still in the receptacle as a result of mechanisms failures |
| F79 | Hindrance for installation a fuel assembly in a reactor receptacle while the receptacle is free, due to failures of mechanisms and operating conditions |
| F117 | Installation of a fuel assembly not in the reactor receptacle |
| F118 | Unauthorised transportation of a lock towards opening the gripper of a fuel assembly when moving vertically |
| F123 | Fuel assembly gripper is opened when the fuel assembly is installed not in the reactor receptacle |
| F124 | Fuel assembly not in the reactor receptacle due to transportation to incorrect vertical coordinates |

In table 5 and further, designations of OMSP and other events correspond to those typically used by a specialist in the art, for example, those, mentioned in the Handbook of Parameter Estimation for Probabilistic Risk Assessment (NUREG/CR-6823) Publ. Date September 2003, Prepared for Division of Risk Analysis and Applications Office of Nuclear Regulatory Research U.S. Nuclear Regulatory Commission Washington, D.C. 20555-0001, NRC Job Code W6970 and also those typically used in the Russian Nuclear Power Stations practice.

The next step is splitting the transportation technological operation "Installation of a fuel assembly into a reactor" into intervals $R_j$ ($1 \leq j \leq m$) with invariable safety conditions.

This step includes:
transportation of a fuel assembly from transportation position down to the reactor receptacle;
installation of a fuel assembly into reactor receptacle;
opening of a gripper of a fuel assembly;
removing the gripper from the fuel assembly head;
transporting of an empty gripper upwards to the transportation position.

To split the above operation into intervals with constant safety conditions, i.e. safety intervals (SI), a table is compiled (as shown in FIG. 7) similar to the table of FIG. 1.

The technological operation can be divided into the following intervals:

R17—transportation of a fuel assembly down, so that the level of a tail of a fuel assembly is 200 mm above the level of heads of fuel assemblies;

R18—fuel assembly is moved down, so that the level of a tail of a fuel assembly is at the level of heads of fuel assemblies;

R19—transportation of a tail of a fuel assembly from the level of heads of fuel assemblies to the level of a reactor receptacle.

R21—Installation of a fuel assembly into reactor receptacle;

R23—Position a gripper lock into open position <<fuel assembly gripper is open>>;

R26—Slip over of the gripper from the articled re-loaded into a reactor;

R07—Misalignment of the gripper to the level which is 4770 mm above the level of heads of re-loaded assemblies in a reactor;

R19—Movement of a gripper into transportation position in the absence of reloaded articles in the reactor.

Analysis of OMSP obtained in the previous step has shown that some OMSP could be revealed not immediately upon their occurrence, but some time after int the course of the engineering process, such as the following:

F40—A bridge is misaligned not into installation coordinates of a fuel assembly;

F41—A cart is misaligned not into installation coordinates of a fuel assembly;

F46—a gripper is misaligned not into installation coordinates of a fuel assembly;

F52—Lock of a gripper is in the intermediate position;

F55—Fuel assembly in not in the reactor receptacle due to incorrect (horizontal) transportation coordinates;

F66—transportation of a picked up fuel assembly in the engineering process;

F123—the gripper is opened while the fuel assembly is installed not in the reactor receptacle.

For the OMSP of the above type, another table is compiled with account of possible propagation of failures through the safety intervals of the given engineering operation (Table 6). The Table 6 is filled in accordance with the following rules which can be designated by respective reference numbers.

TABLE 6

| | | OMSP Designation | | | | | | |
|---|---|---|---|---|---|---|---|---|
| | | F40 | F41 | F46 | F52 | F55 | F66 | F123 |
| R17 | In | + | + | − | + | − | − | − |
| | | × | × | 4 | | | | |
| | Out | + | + | − | + | − | − | − |
| R18 | In | + | + | − | + | − | − | − |
| | | × | × | 4 | | | | |
| | Out | + | + | − | + | − | − | − |
| R19 | IN | + | + | − | + | − | − | − |
| | Out | + | + | + | + | − | − | − |
| R21 | In | + | + | + | + | − | − | − |
| | | 2 | 2 | | | | | |
| | Out | − | − | + | + | + | − | − |
| R23 | In | − | − | + | + | + | − | − |
| | | | | | 1 | | | |
| | Out | − | − | + | − | + | − | + |
| R26 | In | − | − | + | − | + | − | + |
| | | | | 3 | | 3 | | |
| | Out | − | − | − | − | − | + | + |
| R07 | In | − | − | − | − | − | + | + |
| | | | | | | | | 3 |
| | Out | − | − | − | − | − | + | − |
| R08 | In | − | − | − | − | − | + | − |
| | Out | − | − | − | − | − | + | − |

The next step is creating a Table of cause-and-effect connections between OMSP and process failures (Table 7). In the present example, the table is filled for one type of failures only "fall down of a fuel assembly".

Table 7 is created for each safety interval based on the data relating to causes and conditions initiating OMSP, as presented in Table 4 and a list of failures which could result in OMSP as presented in table 5.

For better understanding, the analysis is illustrated in more detail for some failures out of a full list of possible failures of Table 5. In particular, the failures connected with unauthorized opening of a gripper during vertical transportation of a fuel assembly and with possible installation not in the reactor receptacle. In case the fuel assembly is mis-installed not in the reactor receptacle, upon the next opening of a gripper and its removal from the head of the fuel assembly, the fuel assembly can fall down. The results of cause and effect analysis are presented in Table 7.

TABLE 7

| | | Technological process failures, Fi | |
|---|---|---|---|
| number | OMSP | Failure description | Designation |
| R17 | Fuel | Unauthorized positioning of of a | F118 |
| R18 | assembly | gripper lock into open position while | F118 |
| R19 | fall down | the fuel assembly is transported | F118 |

TABLE 7-continued

| | | Technological process failures, Fi | |
|---|---|---|---|
| number | OMSP | Failure description | Designation |
| | | vertically | |
| R21 | | Fuel assembly is not in the reactor receptacle due to misalignment to incorrect vertical coordinates | F124 |
| R23 | | Fuel assembly gripper is open while | F123 |
| R26 | | the fuel assembly is installed not in the reactor receptacle | F123 |
| R07 | | — | — |
| R08 | | — | — |

The results of the above analysis allows generating a deterministic model for the probability analysis and estimation of probability of the event "fall down of a fuel assembly in the operation "Installation of a fuel assembly into reactor".

Deterministic model is created based on the above separation of a technological operation into safety intervals ad on data in tables 4, 5, 6, 7, while limiting the events to those that were agreed to consider within the framework of the current example. Graphic representation of the created deterministic model is presented in FIG. 8.

Figure 8:
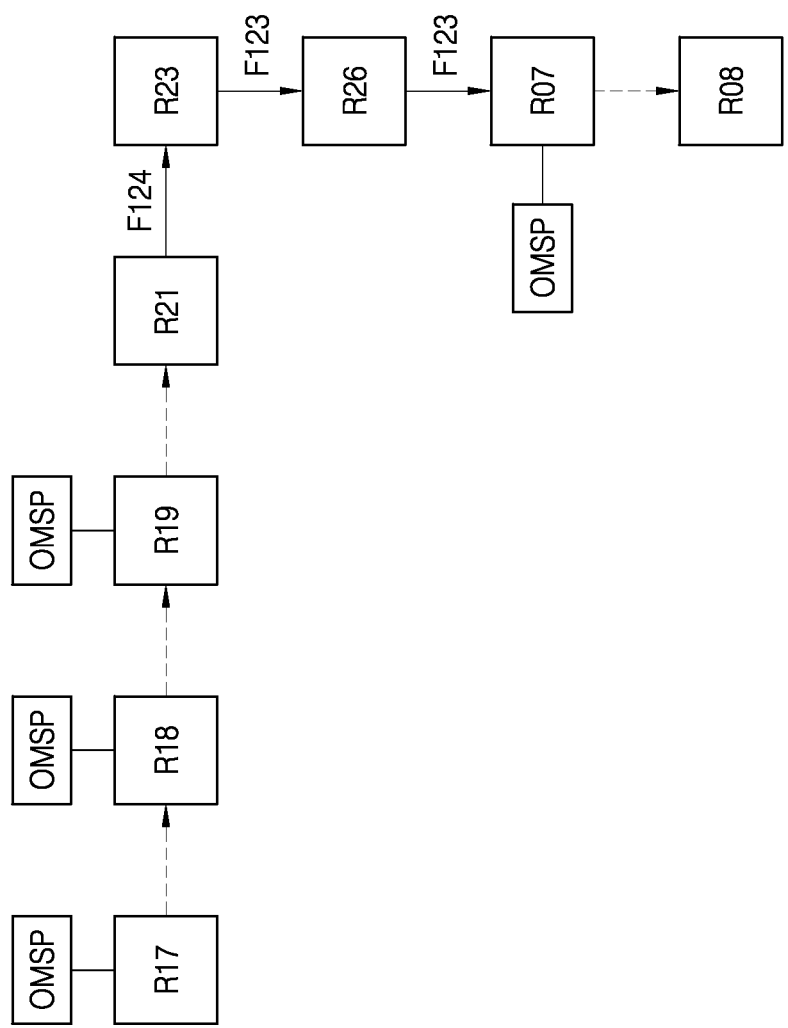
FIG. 8—a deterministic model of an operation of "re-loading of fuel cell into a nuclear reactor"

As shown in FIG. 8, fall down of a fuel assembly in the operation "Installation of fuel assembly into a reactor" can occur as result of the reasons shown for the given example, in the following intervals: R17, R18, R19, R07.

In FIG. 8, dotted lines show technological links between safety intervals of the whole process, whole solid lines show, propagation of failures or transition of failures from one into another interval.

On the next step, a logical-probabilistic model (LPM) is created for further use in analysis and safety evaluation for a re-loading step.

First, LPM is created for the failure "fall down of a fuel assembly" in the given operation. Graphic interpretation for this model is shown in FIG. 9.

The event "Fall down of a fuel assembly" is designated as D01. In addition, to give indication of an interval wherein this event occurred first, the designation is supplemented with designation of this particular interval. Similar rule is valid for process failures.

Symbol Δ positioned under an event model, indicates that this particular event is a consequence of other events and that a separate LPM will be created for this event Symbol ○ positioned under the event indicates that this event is not a consequence of other events and thus, this event can be assigned a certain probability index.

Figure 9:
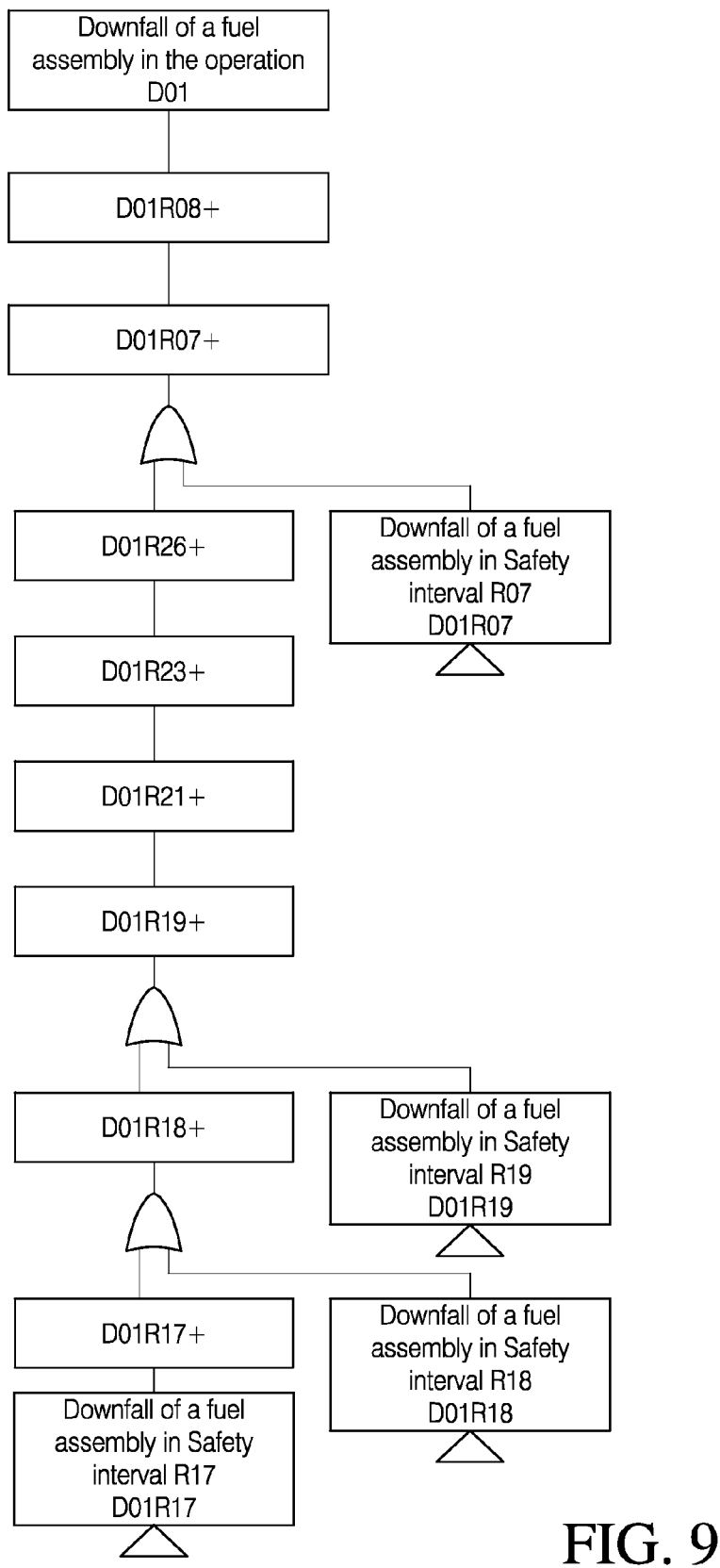
FIG. 9—logical-probablistic model of the initiating event "Fall down of Fuel cell"

As shown in FIG. 9, event D01 corresponds to a logic sum of events D01RXX in each safety interval.

Figure 10:
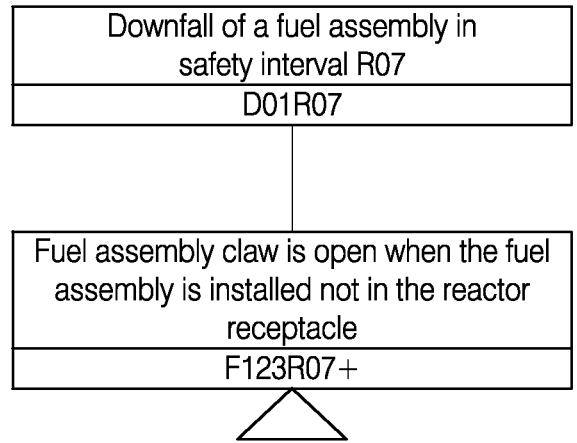
FIG. 10—a deterministic model of the process failure for safety interval R07.
Figure 11:
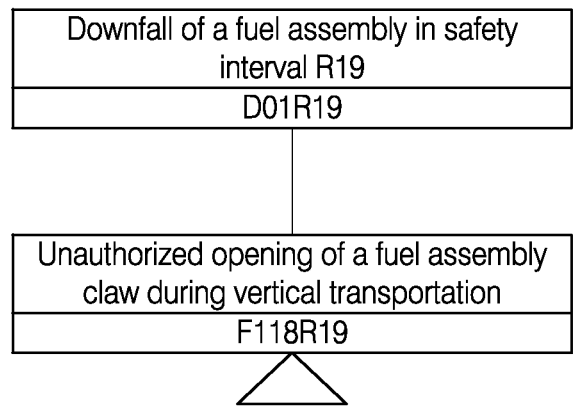
FIG. 11—a deterministic model of the process failure for safety interval R19.
Figure 12:
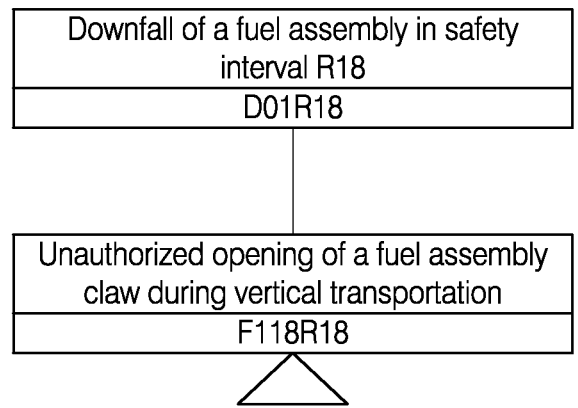
FIG. 12—a deterministic model of the process failure for safety interval R18.
Figure 13:
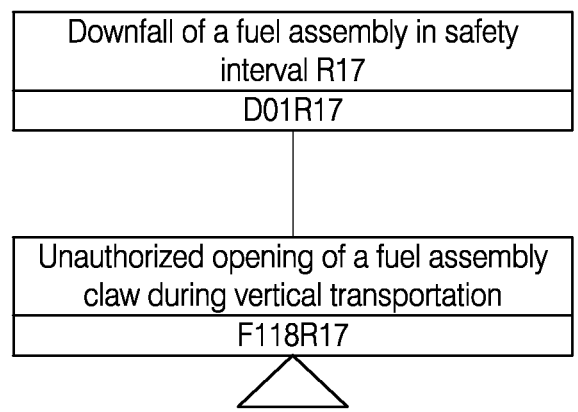
FIG. 13—a deterministic model of the process failure for safety interval R17.

Further, based on Table 7, a model is created for each OMSP in the given SI, as shown in FIGS. 10, 11, 12 и 13 respectively.

The analysis of this models shows that, in these intervals, operational failures occur, as result of other failures that requires creating separate models for these failures as well. Failures of this type include for example F118R17, F118R18, F118R19 и F123R07+.

To create these models, a list of initiating events that can result in these failures, shall be created, and further, possible protections and blocks preventing or interrupting the development of such initiating events. This information can be obtained from the analysis of a technical documentation describing a reloading machine control system (RM CS). The possible list of initiating events is shown in Table 8.

TABLE 8

| Failure number | Initiating events | | Failures of protections and blocks | |
|---|---|---|---|---|
| | Description | Number | Description | Number |
| F118 | Erroneous command of an operator to open a fuel assembly gripper | I061 | Failure of programmable device protection against opening gripper during vertical transportation of a fuel assembly | FP007 |
| | Spontaneous generation of command by remote control unit to open a fuel assembly gripper | I062 | Failure of a programmable technological unit protection against opening of fuel assembly gripper during vertical transportation of fuel assembly | FP033 |
| | Spontaneous generation of command to open a fuel assembly gripper by a programmable technological unit | I063 | — | — |
| F123 | A fuel assembly is not in the reactor receptacle due to incorrect vertical positioning (foreign object in the reactor receptacle) | F124 | Failure of programmable technological unit protection against opening a fuel assembly gripper when the fuel assembly is installed above the required level | FP063 |

Figure 14:
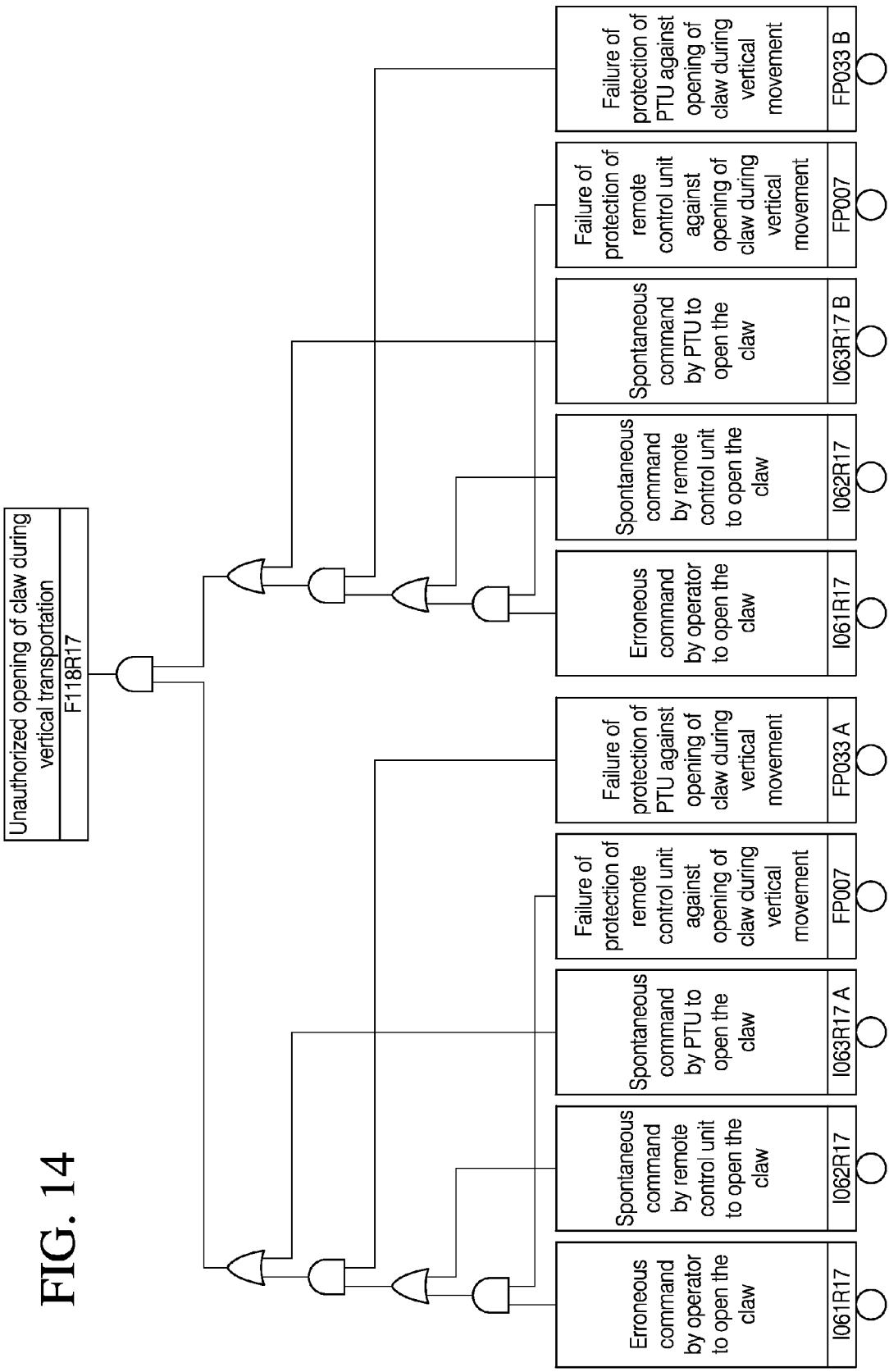
FIG. 14—a logical probabilistic model of the process failure F11 for safety interval R17.

In FIG. 14, a logical probabilistic model LPM for F118R17 is presented. Similar models are created for intervals R18 and RT9.

Figure 15:
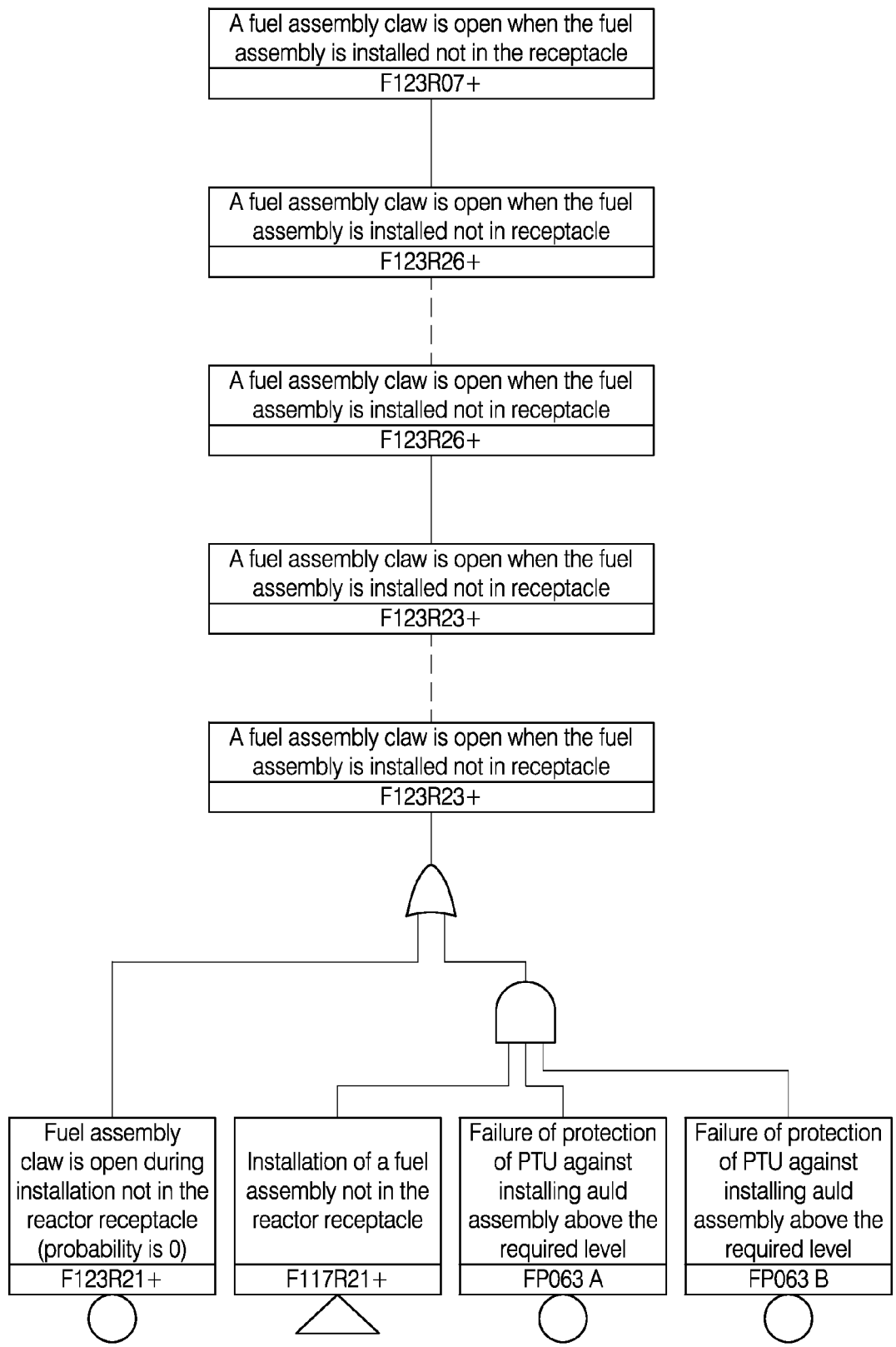
FIG. 15—a sequence of models F123.

Failure F123 is a propagating failure (see. table 6), therefore, to estimate the probability of failure F123 in the interval R07, a sequence of models for F123 shall be created for each of safety intervals. These models are shown in FIG. 15. the models are linked by dotted lines.

Failure F123 arises in the interval R23 as result of failure of protection FP063 during installation of a fuel assembly not in the reactor receptacle (F117). Thus, it is necessary to create another model, F117R21+.

Figure 16:
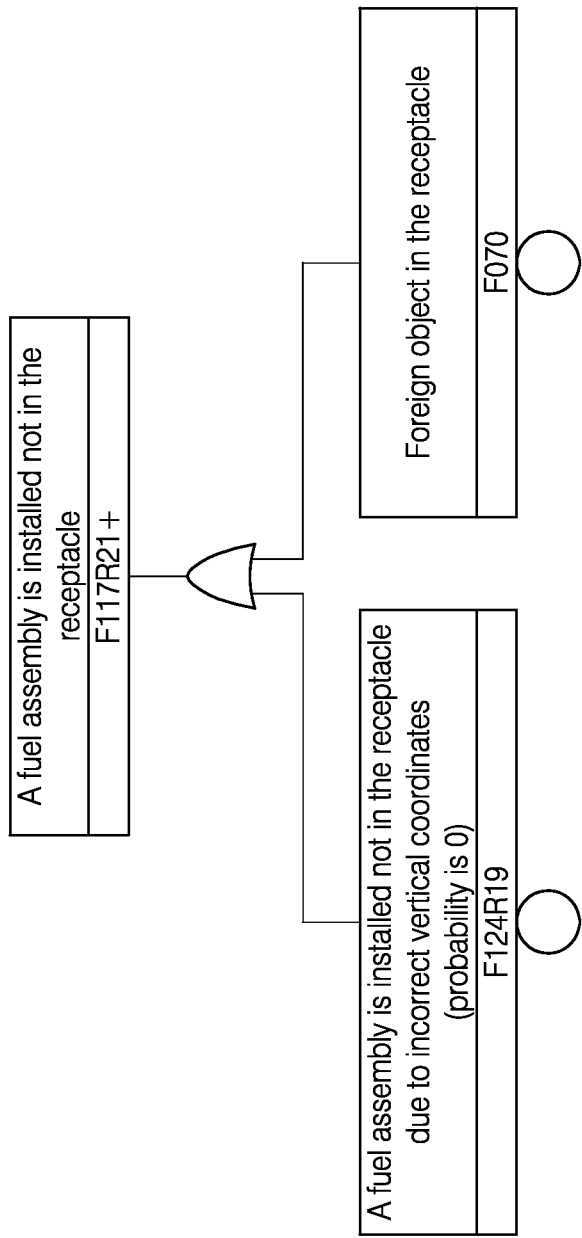
FIG. 16—a logical probabilistic model of the process failure F117 for safety interval R21+.
Figure 17A:
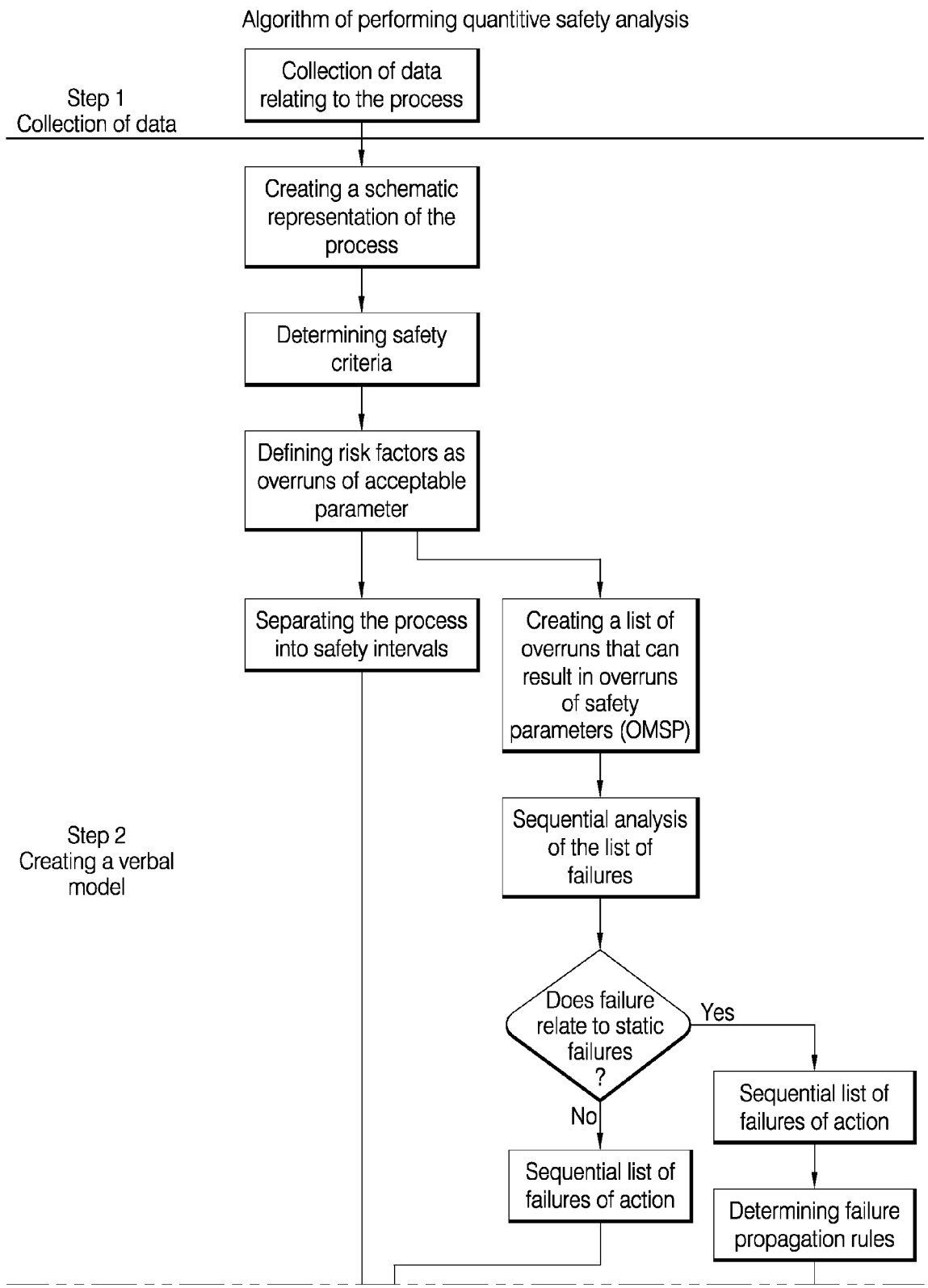
FIGS. 17A, 17B, and 17C, collectively referred to as FIG. 17—a flow chart of an algorithm of quantitative safety analysis according to the example implementation.
Figure 17B:
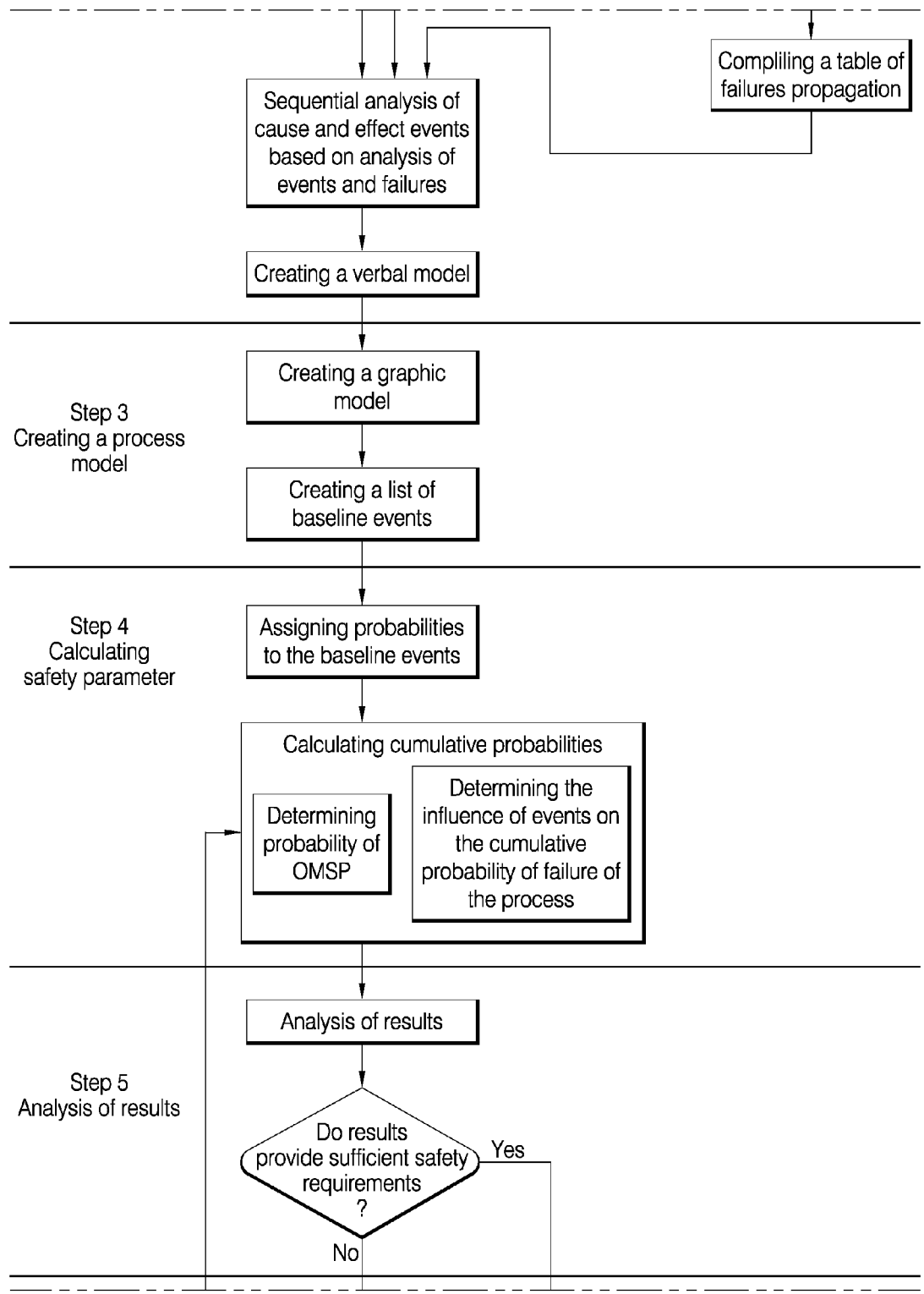
Figure 17C:
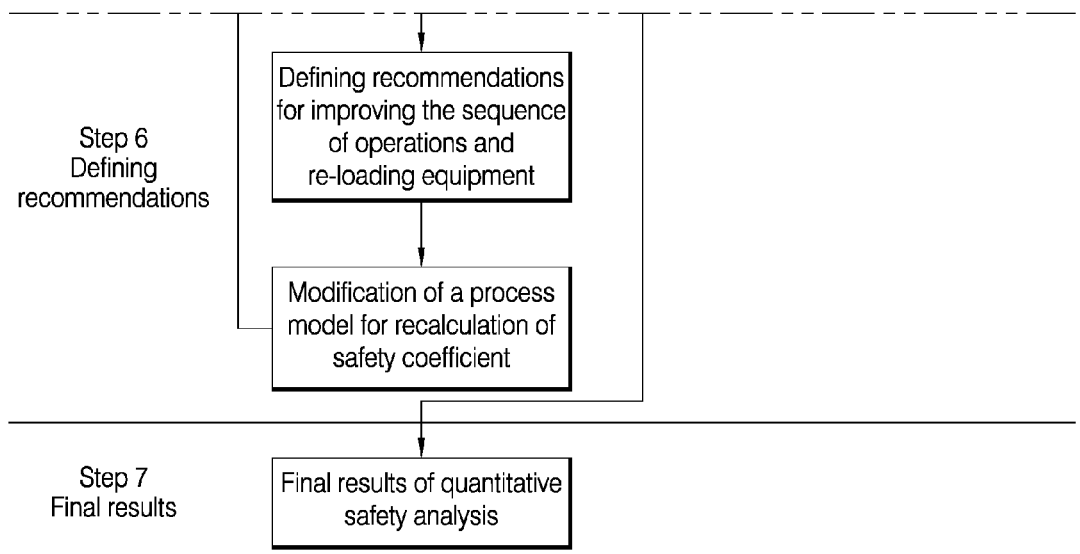
Figure 17:
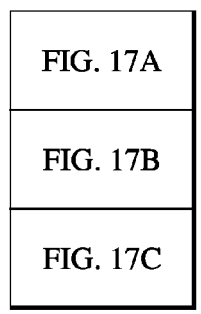
Figure 18:
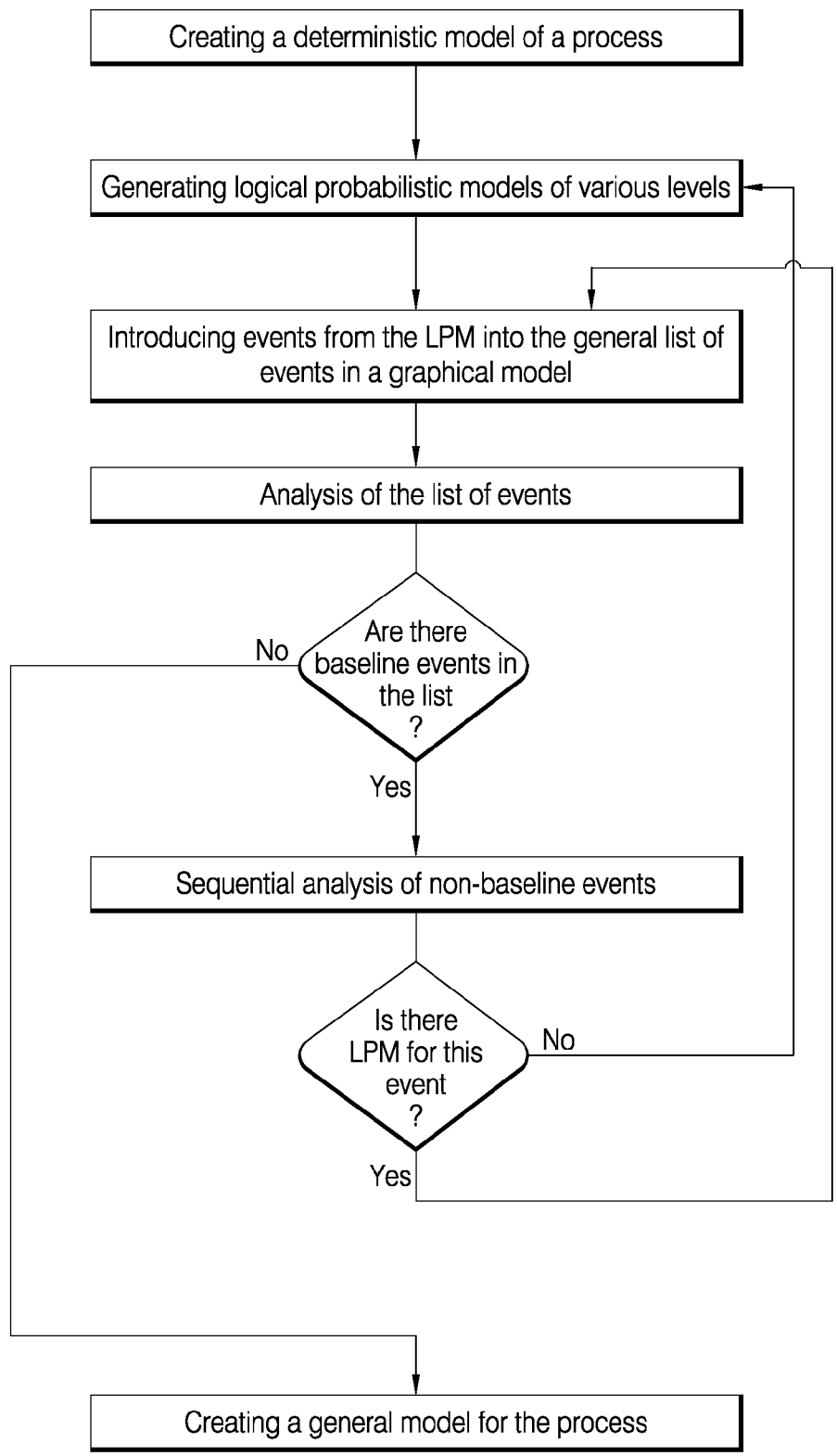
FIG. 18—a flow chart of an algorithm of graphic representation of a safety model.

Installation of a fuel assembly not in a reactor receptacle can be caused by various reasons. In the present example, we will consider the case when the installation of a fuel assembly not in the reactor receptacle is caused by a foreign object in a reactor receptacle. Logical probabilistic model LPM F117R21+ for this case is shown in FIG. 16.

All the generated models are combined into a common model of the event "fall down of a fuel assembly in the operation "Installation of a fuel assembly into a reactor".

As a rule to avoid models becoming cumbersome they are not combined physically.

Combining is performed by linking events of high level models to the latest event of the lower level. This method is practiced for example, for model generation and calculations using programmable unit the Risk Spectrum (RELCON, Sweden).

Events designated by symbol и are baseline events having their own probability indexes. In the present example, these events include but not limited to: FP063, F070, I061, FP007, I062, FP033, I063.

Initial data for probability of baseline events are taken from safety analysis performed for one of the energy units of a nuclear power station of BWR type WWER-1000, and shown in Table 9.

TABLE 9

| Event | Description of the event | Probability of the event, $P(F_{Di})$ |
|---|---|---|
| FP063 | Failure of programmable technological unit protection against opening a fuel assembly gripper when the fuel assembly is installed above the required level | $5 * 10^{-3}$ |
| F070 | Foreign object in the reactor receptacle | $6 * 10^{-3}$ |
| I061R17 | Erroneous generation of a command to open a fuel | $5.4 * 10^{-2}$ |
| I061R18 | assembly gripper by an operator | $2.7 * 10^{-2}$ |
| I061R19 | | $4.12 * 10^{-1}$ |
| FP007 | Failure of a remote control unit protection against opening of a fuel assembly gripper during vertical transportation of fuel assembly | $6.24 * 10^{-3}$ |
| I062R17 | Spontaneous generation of command by remote control unit | $8.1 * 10^{-5}$ |
| I062R18 | to open a fuel assembly gripper | $4.05 * 10^{-5}$ |
| I062R19 | | $6.18 * 10^{-4}$ |
| FP033 | Failure of a programmable technological unit protection against opening of fuel assembly gripper during vertical transportation of fuel assembly | $5 * 10^{-3}$ |
| I063R17 | Spontaneous generation of command by programmable | $5.4 * 10^{-5}$ |
| I063R18 | technological unit to open a fuel assembly gripper | $2.7 * 10^{-5}$ |
| I063R19 | | $4.12 * 10^{-4}$ |

The probability of the events was calculated with account of a total number of operations for installing a fuel assembly into a reactor, which are performed during the process of re-loading of an active core.

The calculations and data analysis was performed using programmable unit Risk Spectrum [Risk Spectrum PSA Professional 1.20/Theory Manual—RELCON AB, 1998.-57c.].

Calculation results are presented in table 10.

TABLE 10

| No | Probability $P(\Sigma F_i)$ | Contribution % | Event $F_1$ | Event $F_2$ | Event $F_3$ | Event $F_4$ |
|---|---|---|---|---|---|---|
| 1 | 1.70E−07 | 39.27 | I063R19 A | I063R19 B | | |
| 2 | 1.50E−07 | 34.71 | F070R21 | FP063 A | FP063 B | |
| 3 | 6.43E−08 | 14.87 | FP007 | FP033 A | FP033 B | I061R19 |
| 4 | 1.55E−08 | 3.57 | FP033 A | FP033 B | I062R19 | |
| 5 | 8.42E−09 | 1.95 | FP007 | FP033 A | FP033 B | I061R17 |
| 6 | 5.30E−09 | 1.23 | FP007 | FP033 B | I061R19 | I063R19 A |
| 7 | 5.30E−09 | 1.23 | FP007 | FP033 A | I061R19 | I063R19 B |
| 8 | 4.21E−09 | 0.97 | FP007 | FP033 A | FP033 B | I061R18 |
| 9 | 2.92E−09 | 0.67 | I063R17 A | I063R17 B | | |
| 10 | 2.03E−09 | 0.47 | FP033 A | FP033 B | I062R17 | |
| 11 | 1.27E−09 | 0.29 | FP033 A | I062R19 | I063R19 B | |
| 12 | 1.27E−09 | 0.29 | FP033 B | I062R19 | I063R19 A | |
| 13 | 1.01E−09 | 0.23 | FP033 A | FP033 B | I062R18 | |
| 14 | 7.29E−10 | 0.17 | I063R18 A | I063R18 B | | |
| 15 | 9.10E−11 | 0.02 | FP007 | FP033 B | I061R17 | I063R17 A |
| 16 | 9.10E−11 | 0.02 | FP007 | FP033 A | I061R17 | I063R17 B |
| 17 | 2.27E−11 | 0.01 | FP007 | FP033 A | I061R18 | I063R18 B |
| 18 | 2.27E−11 | 0.01 | FP007 | FP033 B | I061R18 | I063R18 A |
| 19 | 2.19E−11 | 0.01 | FP033 B | I062R17 | I063R17 A | |
| 20 | 2.19E−11 | 0.01 | FP033 A | I062R17 | I063R17 B | |
| 21 | 5.47E−12 | 0 | FP033 B | I062R18 | I063R18 A | |
| 22 | 5.47E−12 | 0 | FP033 A | I062R18 | I063R18 B | |
| Total probability of "fall down of a fuel assembly" | 4.322E−07 | | | | | |

In this table, along with cumulative probability of a fall down of a fuel assembly int the operation "Installation of a fuel assembly into a reactor", additionally, probabilities of separate minimal cut-offs (MCO), which allows to define groups of baseline events which influence to the greatest extent the probability of the event "the fall down of a fuel assembly".

In practice, the Fussell-Vesely importance measure can be also used for this analysis. It is constructed using minimal cut sets. A cut set is a set of basic events whose occurrence causes the top event to occur. A minimal cut set is a cut set that would not remain a cut set if any of its basic events were removed. Thus, Fussell-Vesely (FV) coefficient shows the extent (which can be presented in %) of reduction in the probability of a given event (such as "a fall down of a fuel assembly"), in case each of the system components become absolutely unreliable. The simplicity of interpretation of the FV coefficient allows using it to generate recommendations on how to exclude the weak sites in the analysed system or process.

Values or FV coefficients for the above studied events are presented in Table 11.

TABLE 11

| No | Baseline event | Description of the event | FV |
|---|---|---|---|
| 1 | I063 | Spontaneous generation of command by programmable technological unit to open a fuel assembly gripper | $4.079 * 10^{-01}$ |
| 2 | FP063 | Failure of programmable technological unit protection against opening a fuel assembly gripper when the fuel assembly is installed above the required level | $3.47 * 10^{-01}$ |
| 3 | F070 | Foreign object in the reactor receptacle | $3.47 * 10^{-01}$ |
| 4 | FP033 | Failure of a programmable technological unit protection against opening of a fuel assembly gripper during vertical transportation of fuel assembly | $2.362 * 10^{-01}$ |
| 5 | FP007 | Failure of a remote control unit protection against opening of a fuel assembly gripper during vertical transportation of fuel assembly | $2.03 * 10^{-01}$ |
| 6 | I061 | Erroneous generation of a command to open a fuel assembly gripper by an operator | $1.732 * 10^{-01}$ |
| 7 | I062 | Spontaneous generation of command by remote control unit to open a fuel assembly gripper | $4.164 * 10^{-02}$ |

Analysis of the obtained data shows that the probability of the event "a fall down of a fuel assembly" is mostly influenced by baseline events I063, FP063 and F070 (FV=0.347÷0.408), the first two events being connected to failures of programmable technological unit (as linked with control function and protection function).

TABLE 13

| No | Probability $P(\Sigma F_i)$ | Contribution % | Event $F_1$ | Event $F_2$ | Event $F_3$ | Event $F_4$ |
|---|---|---|---|---|---|---|
| 1 | 1.06E−08 | 39.24 | I063R19 A | I063R19 B | | |
| 2 | 0.93E−08 | 34.43 | F070R21 | FP063 A | FP063 B | |
| 3 | 4.01E−09 | 14.84 | FP007 | FP033 A | FP033 B | I061R19 |
| 4 | 0.97E−09 | 3.59 | FP033 A | FP033 B | I062R19 | |
| 5 | 5.26E−10 | 1.95 | FP007 | FP033 A | FP033 B | I061R17 |
| 6 | 3.31E−10 | 1.23 | FP007 | FP033 B | I061R19 | I063R19A |
| 7 | 3.31E−10 | 1.23 | FP007 | FP033 A | I061R19 | I063R19 B |
| 8 | 2.62E−10 | 0.97 | FP007 | FP033 A | FP033 B | I061R18 |
| 9 | 1.82E−10 | 0.67 | I063R17 A | I063R17 B | | |
| 10 | 1.27E−10 | 0.47 | FP033 A | FP033 B | I062R17 | |
| Total probability of "fall down of a fuel assembly" | 2.701E−08 | | | | | |

The heart of the programmable technological unit (hardware and software) is controllers having control software and software providing blocks and protection against failures loaded thereon.

Thus, programmable technological unit failures can be caused both by hardware faults and software failures, such as bugs and multiple errors not revealed during debugging. However, if software is functioning for a long period of time on several objects without showing significant defects, the probability of failure due to software errors can be considered as negligible. The probability of failures due to controller errors depends on the reliability of its components and quality of manufacturing process guaranteed by the manufacturer. Typically, controllers of different types provided by different manufacturers are characterised by different reliability and this allows to replace less reliable controllers with controllers of same functionality but higher reliability.

Analysis of reliability of programmable controllers manufactured by leading manufactures has shown that for programmable technological units those controllers shall be chosen that are characterized by reliability orders higher than the other equipment.

As can be seen further below, the replacement of existing controllers with controllers with higher reliability significantly improves the unit performance and reduced the probability of fall down of a fuel assembly.

In table 12, data are presented for the same events, but in case the controllers are replaced by new controllers (manufactured by Siemens).

TABLE 12

| Event (failure) $F_i$ | Description of the event | Probability $P(F_i)$ |
|---|---|---|
| | Failure of programmable technological unit protection | 1.25 * 10−3 |
| FP033 | Failure of a programmable technological unit protection against opening of a fuel assembly gripper during vertical transportation of fuel assembly | 1.25 * 10−3 |
| I063 | Spontaneous signals generated by programmable controllers | 1.35 * 10−5 |
| | | 0.675 * 10−5 |
| | | 1.03 * 10−4 |

For other events, the probabilities are the same as presented in table 10.

Further, a new calculation was made for a fall down of a fuel assembly. The results are presented below in table 13.

The obtained results show that the probability of the event "fall down of a fuel assembly" when new controllers with higher reliability were used, have reduced more than times (previously was 4,322E-07).

Thus, a object oriented modification of characteristics of a system using the proposed method for deterministic safety analysis based on separation of the process into safety intervals results in significant decrease of failure probability and damages to the re-loaded articles.

The above example is illustrative only and cannot be taken separately as a characteristic of probability of the event "fall down of a fuel assembly" since the analysis was made while some events were omitted for the sake of simplicity

What is claimed is:

1. A computer-implemented method of control of a high risk engineering process, the engineering process involving non-stationary objects, wherein the method comprises:
   measuring with measurement devices a plurality of process parameters Pi (1<i<n) on the objects involved in the engineering process;
   defining a maximum permissible value of the process parameter P.ipermitted;
   comparing each actual measured process parameter Pi with the respective permitted process parameter P.ipermitted in order to determine failures Fi=f(Pi) of the engineering process, when Pi>P.ipermitted;

wherein for each determined failure $F_i=f(P_i>P.i_{permitted})$, defining a plurality of process parts, which are affected by the said failure, and dividing the process into a plurality of safety intervals $R_j=\{F1, F2, Fi \ldots Fm\}$ ($1<j<m$) and ($1<n<m$), wherein each safety interval is associated with a subset of the process parts and wherein a combination $Sum.i=1..n$ $F_i$ of the said failures remains invariable for all intervals; wherein each safety interval $Rj$ is subject to:

analyzing, by a computer executing software, of transitions of failures $F_i=f(P_i>P.i_{permitted})$ in the engineering process from one to another safety interval based on analysis of cause-effect relations;

modeling by construction of deterministic safety models based on an analysis of possible scenarios of the transitions of failures $F_i=f(P_i>P.i_{permitted})$ of the engineering process from one to next safety interval, and defining a failure probability of the equipment used for the engineering process based on constructed models of each safety interval $Rj$, and correspondingly modifying the engineering process to reach the required safety parameters.

2. A method of claim 1, further comprising creating deterministic models of the safety intervals $R_j$ based on analysis of possible scenarios of the transitions of failures of the engineering process from one to next safety interval $R_{j+1}$.

3. A method of claim 1, wherein the engineering process is divided into safety intervals with account of each failure $F_i=f(P_i>P_{ipermitted})$ in each part of the engineering process for each chosen safety parameter $P_{imax}$.

4. A method of claim 1, further comprising construction of logical or logical-probabilistic models for each failure $F_i=f(P_i>P_{imax})$.

5. A method of claim 4, wherein the logical or logical-probabilistic models are constructed based upon analysis of possible impacts $P_i$, which result in respective failures $F_i=f(P_i>P_{imax})$ of the engineering process, and combinations of the impacts.

6. A method of claim 1, wherein the non-stationary object is selected from at least one of the following: an engineering process as a whole, at least one stage or part of an engineering process or any combination thereof, products, devices, units, in which process, stage, product, device or unit the safety conditions vary depending on time and allocation of the product, device or unit, in particular depending on which stage or part of the engineering process the product, device or unit is located.

7. A method of claim 6, wherein switching from consideration of non-stationary engineering process to consideration of stationary parts of engineering process, based on analysis of distribution of areas affected by the determined failures $F_i=f(P_i>P_{imax})$ in different parts of the engineering process.

8. A method of claim 1, wherein switching to stationary conditions based on analysis and safety evaluation of each safety interval $R_j$ of the engineering process.

9. A method of claim 1, wherein an analysis and a safety evaluation of the engineering process are performed by plotting diagrams of partition into safety intervals $R_j$.

10. A method of claim 1, further comprising creating deterministic models of the safety intervals $R_j$ based on analysis of possible scenarios of the transitions of failures of the engineering process from one to next safety interval $R_{j+1}$.

11. A method of claim 1, further comprises a step of creating a deterministic-probabilistic safety model of the whole engineering process.

12. A method of claim 11, wherein the deterministic-probabilistic safety models of the whole engineering process are created using the obtained deterministic models of the safety intervals $R_j$.

13. A method of claim 11, wherein the deterministic-probabilistic safety models of the whole engineering process are created using obtained logical-probabilistic models of occurrence of failures $F_i=f(P_i>P_{imax})$.

14. A method of claim 11, wherein the deterministic-probabilistic safety models of the whole engineering process are created using obtained deterministic models of the safety intervals $R_j$ and logical-probabilistic models of occurrence of failures $F_i=f(P_i>P_{imax})$ of the engineering process.

15. A method of claim 1, wherein the analysis of failure transitions in engineering process is performed based on cause-effect relations of failures $F_i=f(P_i>P_{imax})$, possible failures $F_i=f(P_i)$ of the engineering process and malfunction of protectors or locks on each stage of the engineering process.

16. A method of claim 1, wherein an analysis of distribution of an areas affected by a sources of danger is performed by analysis of each unit part of an engineering process stage, in order to determine particular source of danger, which could result in overrun of any one acceptable impact $P_{imax}$.

17. A method of claim 1, wherein the engineering process is divided into safety intervals with account of each failure $F_i=f(P_i>P_{ipermitted})$ in each part of the engineering process for each chosen safety parameter $P_{imax}$.

18. A method of claim 1, wherein the acceptable impacts $P_{imax}$ are normative impacts, specified in normative documentation on safety.

* * * * *